United States Patent
Park et al.

(10) Patent No.: US 10,547,209 B2
(45) Date of Patent: Jan. 28, 2020

(54) WIRELESS POWER TRANSFER METHOD, APPARATUS AND SYSTEM

(71) Applicant: LG ELECTRONICS INC., Seoul (KR)

(72) Inventors: Yongcheol Park, Seoul (KR); Hyunbeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 312 days.

(21) Appl. No.: 15/312,550

(22) PCT Filed: Jun. 10, 2015

(86) PCT No.: PCT/KR2015/005832
§ 371 (c)(1),
(2) Date: Nov. 18, 2016

(87) PCT Pub. No.: WO2015/190828
PCT Pub. Date: Dec. 17, 2015

(65) Prior Publication Data
US 2017/0093224 A1    Mar. 30, 2017

Related U.S. Application Data

(60) Provisional application No. 62/024,855, filed on Jul. 15, 2014, provisional application No. 62/011,867, filed on Jun. 13, 2014.

(30) Foreign Application Priority Data

Apr. 1, 2015    (KR) .......................... 10-2015-0046438

(51) Int. Cl.
*H02J 50/80*     (2016.01)
*H02J 50/12*     (2016.01)
(Continued)

(52) U.S. Cl.
CPC .............. *H02J 50/12* (2016.02); *H02J 50/40* (2016.02); *H02J 50/80* (2016.02); *H02J 50/90* (2016.02)

(58) Field of Classification Search
CPC .. H02J 50/12; H02J 50/80; H02J 50/40; H02J 50/90
See application file for complete search history.

(56) References Cited

U.S. PATENT DOCUMENTS 6,490,257 B1 *  12/2002  Watanabe ............ H04B 7/0608
                                                370/318
8,947,041 B2 *   2/2015  Cook ................... G06K 7/0008
                                                320/108
(Continued)

FOREIGN PATENT DOCUMENTS

EP      2 731 231 A2      5/2014
EP       2852025 A1       3/2015
(Continued)

*Primary Examiner* — Pinping Sun
(74) *Attorney, Agent, or Firm* — Birch, Stewart, Kolasch & Birch, LLP

(57) ABSTRACT

The present disclosure relates to a wireless power transmitter for performing communication with a wireless power receiver using a plurality of slots, and the wireless power transmitter may include a power conversion unit configured to transmit a wireless power signal to the wireless power receiver, and a power transmission control unit configured to perform communication with the wireless power receiver using the wireless power signal, wherein the power transmission control unit performs steps including receiving control information from the wireless power receiver within any one of the plurality of slots, transmitting an ACK signal to the wireless power receiver in response to the control information, and allocating the any one slot to the wireless (Continued)

power receiver to perform communication with the wireless power receiver using the any one slot when the ACK signal is received.

17 Claims, 20 Drawing Sheets

(51) Int. Cl.
*H02J 50/40* (2016.01)
*H02J 50/90* (2016.01)

(56) References Cited

U.S. PATENT DOCUMENTS

| | | | |
|---|---|---|---|
| 8,965,461 B2* | 2/2015 | Toncich | G06K 7/0008 |
| | | | 455/572 |
| 9,306,401 B2 | 4/2016 | Lee et al. | |
| 2007/0274320 A1 | 11/2007 | Joshi et al. | |
| 2009/0271048 A1* | 10/2009 | Wakamatsu | G06F 1/266 |
| | | | 700/296 |
| 2010/0248622 A1* | 9/2010 | Lyell Kirby | H02J 7/025 |
| | | | 455/41.1 |
| 2011/0228733 A1* | 9/2011 | Koo | H04W 72/04 |
| | | | 370/329 |
| 2012/0306284 A1* | 12/2012 | Lee | H02J 17/00 |
| | | | 307/104 |
| 2012/0313447 A1 | 12/2012 | Park et al. | |
| 2012/0329405 A1* | 12/2012 | Lee | H02J 17/00 |
| | | | 455/73 |
| 2013/0063082 A1* | 3/2013 | Lee | H02J 7/025 |
| | | | 320/108 |
| 2013/0154557 A1 | 6/2013 | Lee et al. | |
| 2013/0200844 A1* | 8/2013 | Lee | H04B 5/0037 |
| | | | 320/108 |
| 2014/0125138 A1 | 5/2014 | Chen et al. | |
| 2014/0159508 A1 | 6/2014 | Sankar et al. | |
| 2015/0131570 A1* | 5/2015 | Kwon | H04W 74/002 |
| | | | 370/329 |
| 2015/0171931 A1* | 6/2015 | Won | H02J 5/005 |
| | | | 320/108 |
| 2015/0194814 A1* | 7/2015 | Taylor | H02J 5/005 |
| | | | 307/31 |
| 2016/0323824 A1* | 11/2016 | Xhafa | H04W 52/0235 |
| 2017/0117757 A1* | 4/2017 | Park | H02J 50/80 |

FOREIGN PATENT DOCUMENTS

| | | | |
|---|---|---|---|
| KR | 10-2012-0128099 A | 11/2012 | |
| WO | WO 2012/165672 A1 | 12/2012 | |
| WO | WO 2013/172630 A1 | 11/2013 | |
| WO | WO-2013176751 A1 * | 11/2013 | H02J 5/005 |
| WO | WO 2014/001983 A1 | 1/2014 | |

* cited by examiner

[Fig. 1]
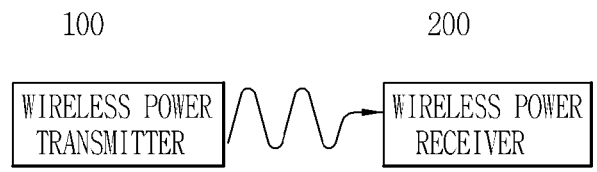
[Fig. 2a]
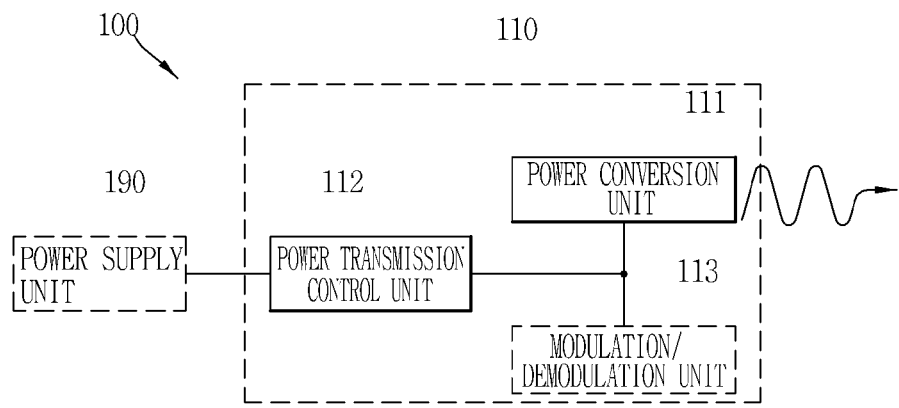
[Fig. 2b]
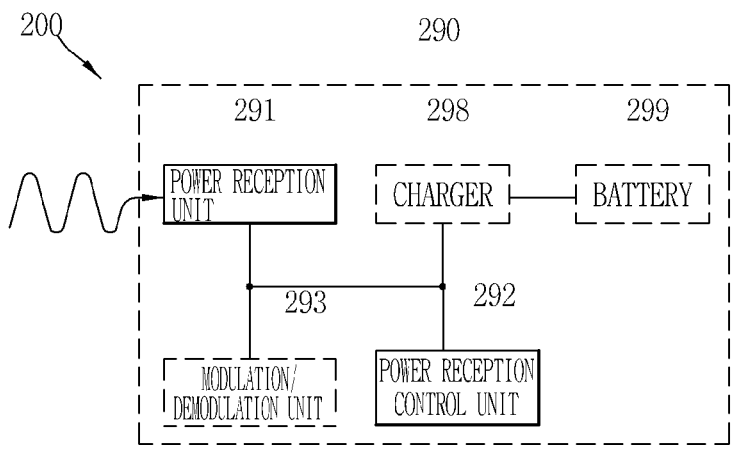

[Fig. 3]
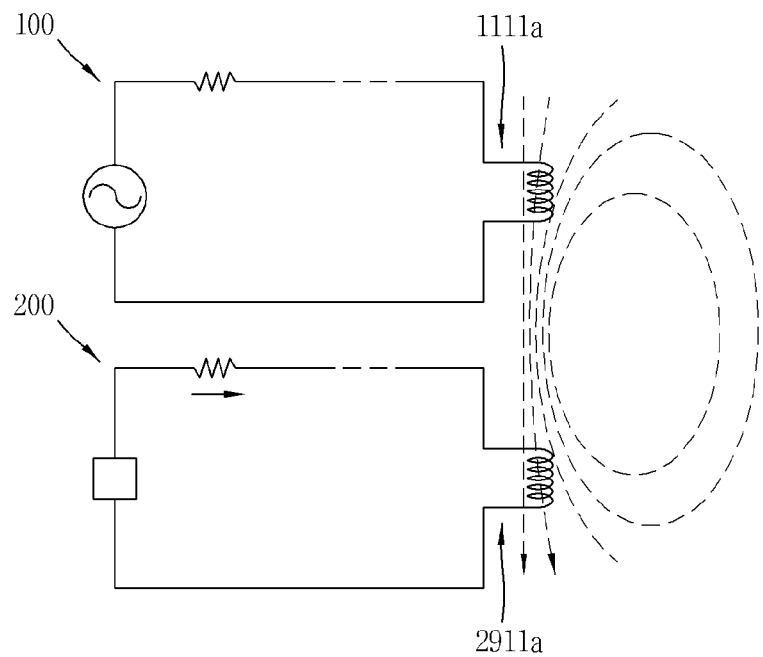
[Fig. 4a]
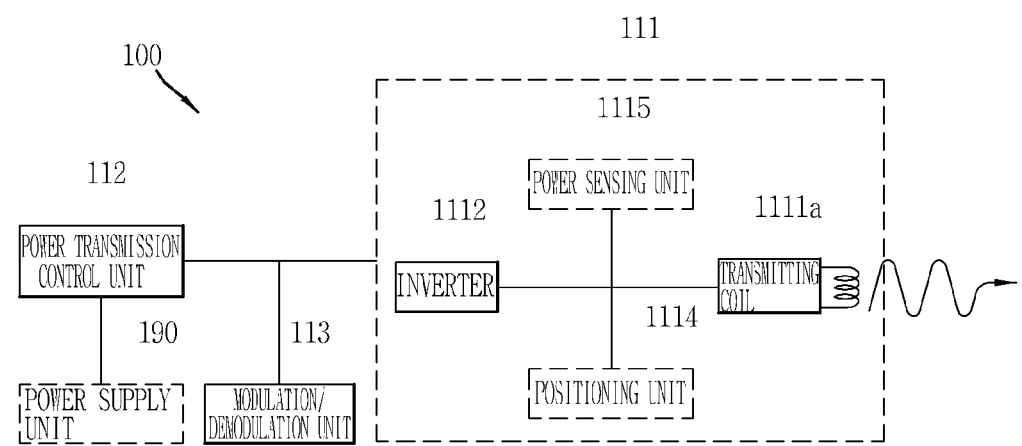

[Fig. 4b]
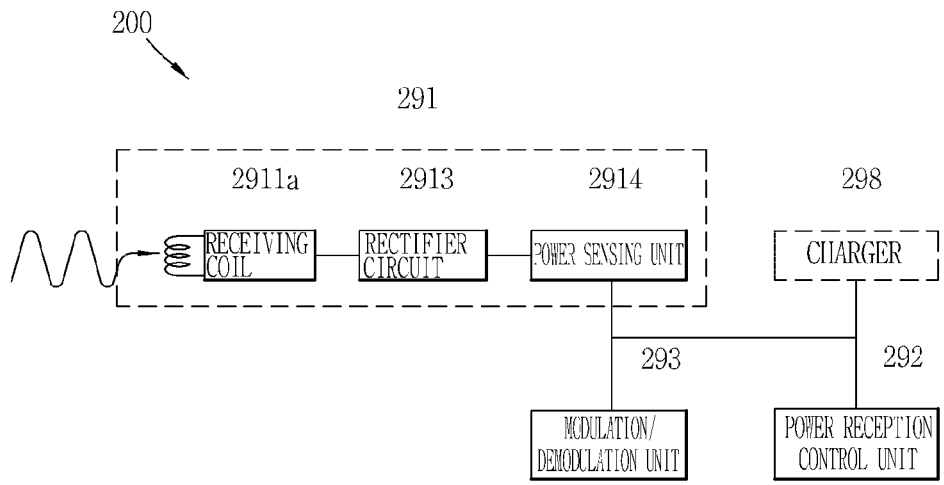
[Fig. 5]
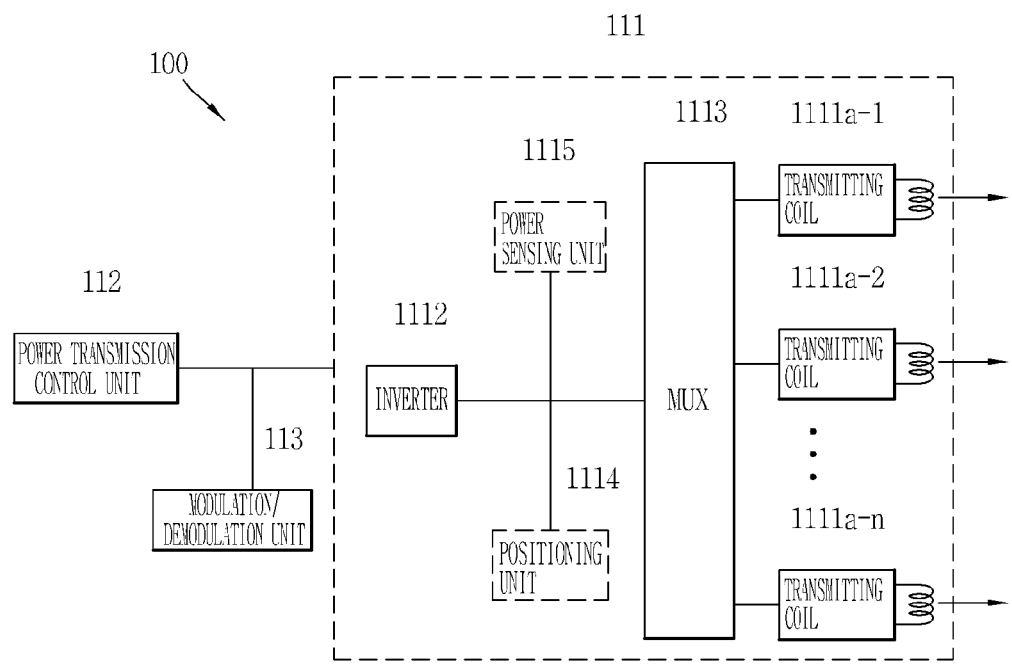

[Fig. 6]
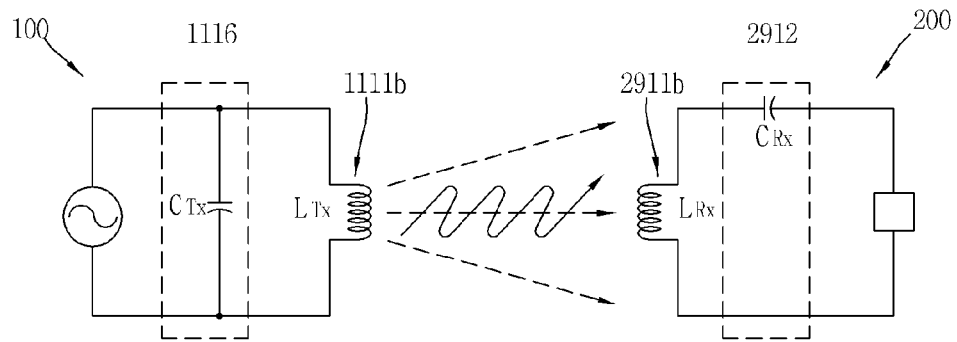
[Fig. 7a]
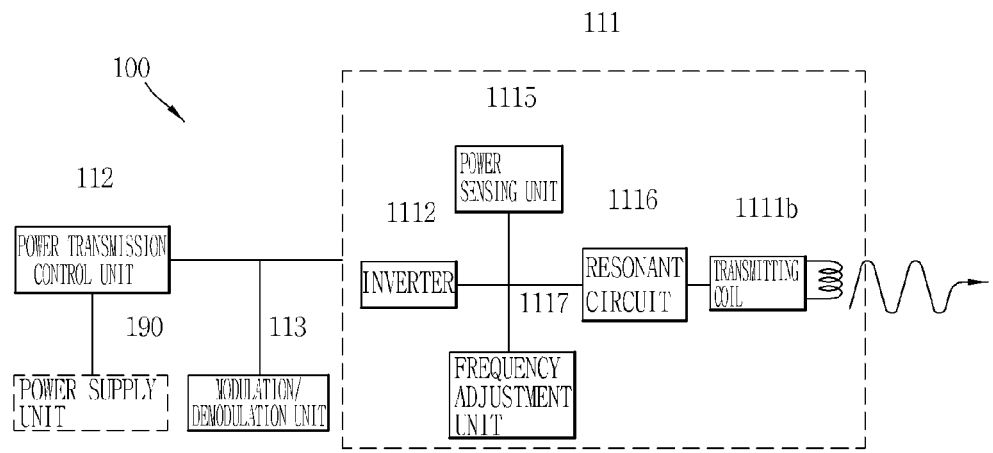
[Fig. 7b]
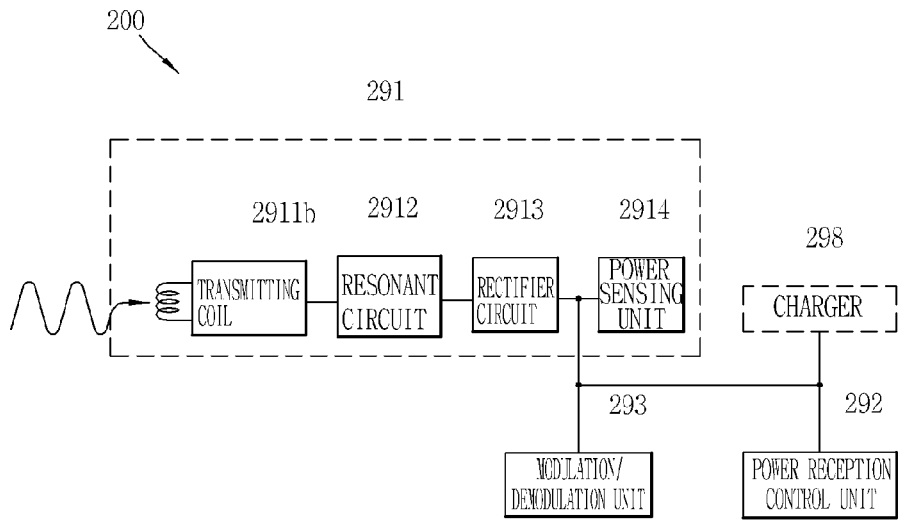

[Fig. 8]
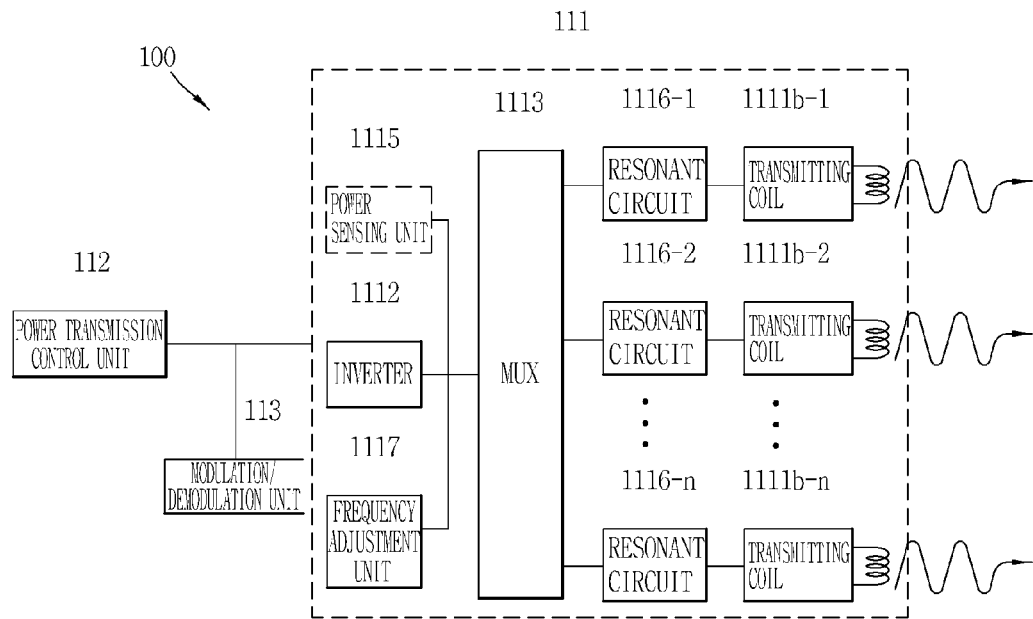
[Fig. 9]
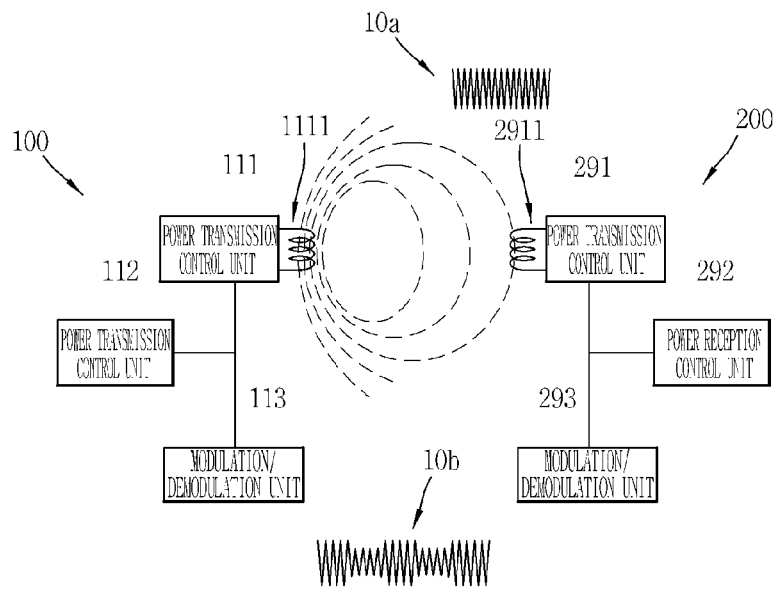

[Fig. 10]
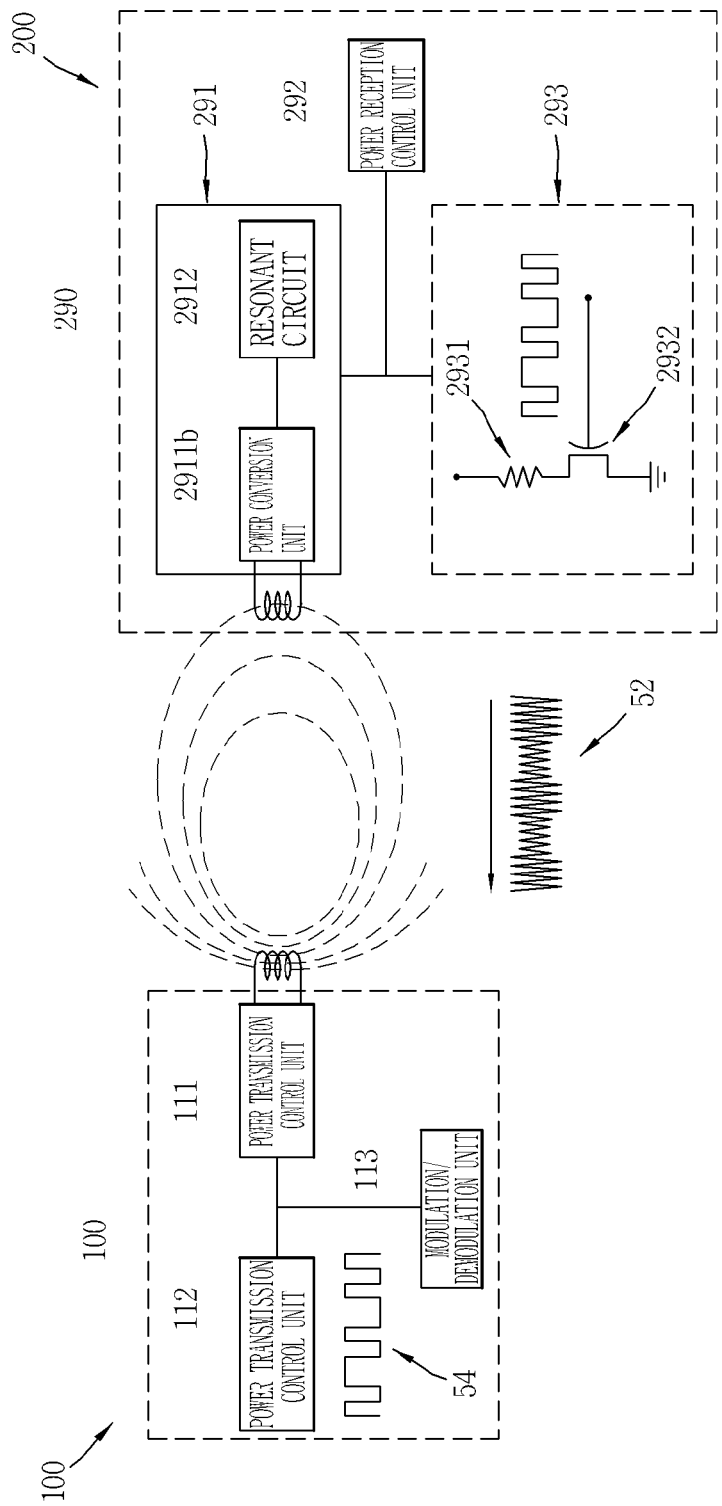

[Fig. 11a]
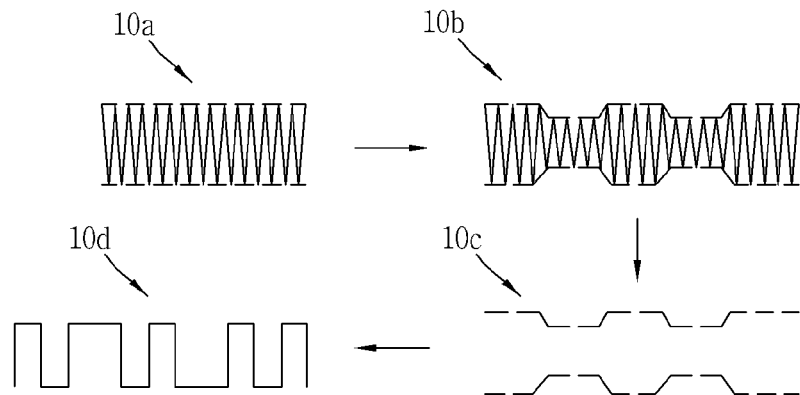
[Fig. 11b]
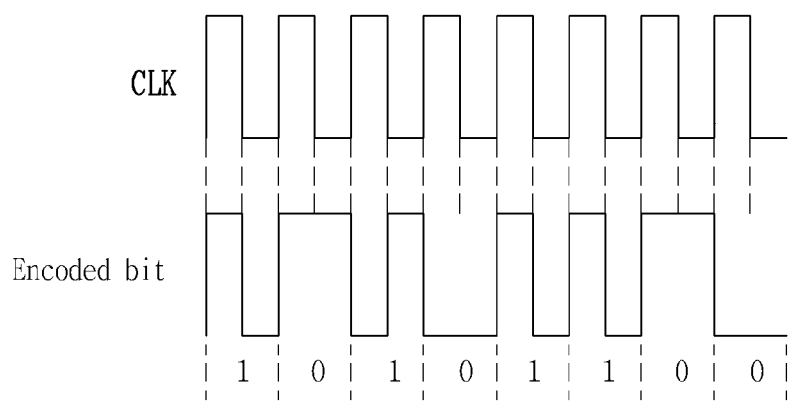
[Fig. 11c]
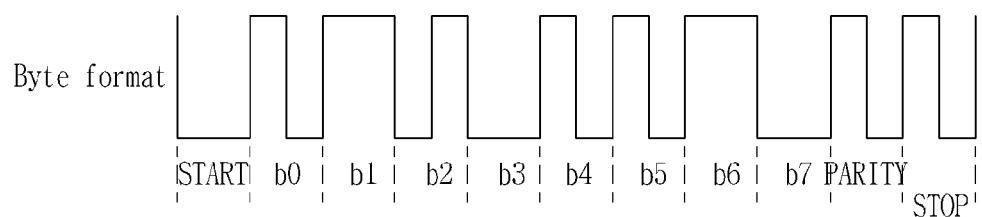
[Fig. 12a]
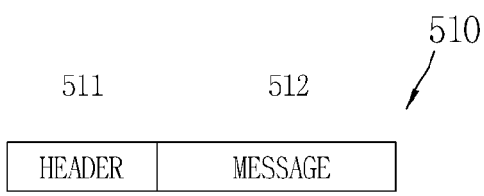

[Fig. 12b]
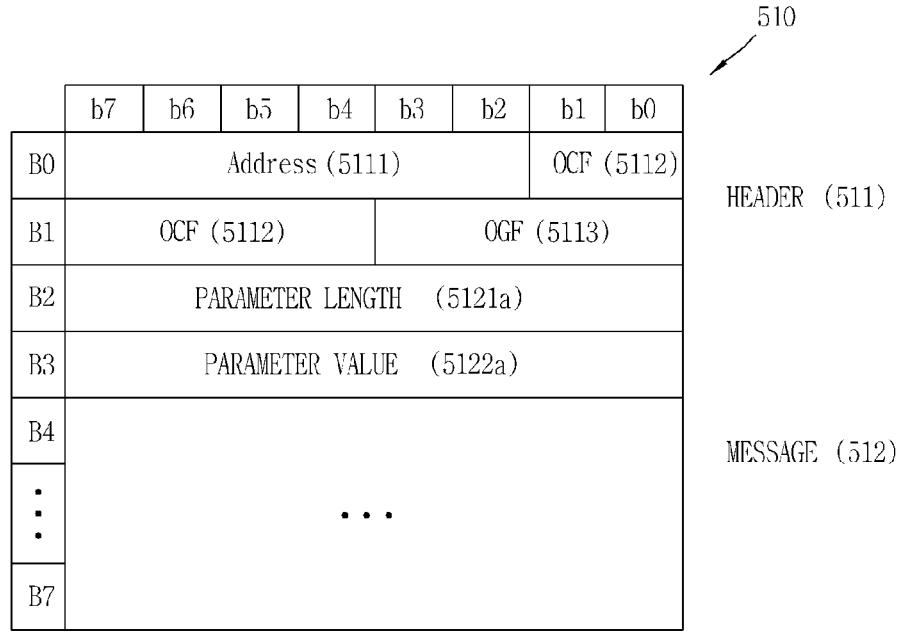
[Fig. 12c]
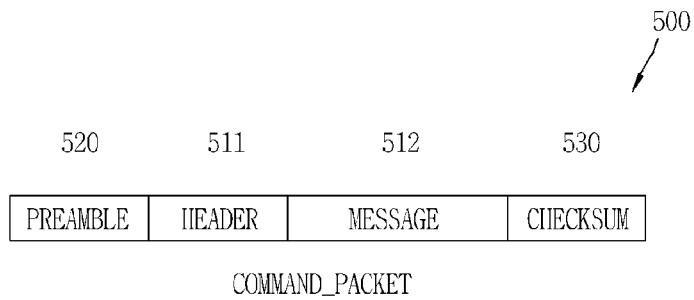
COMMAND_PACKET
[Fig. 13]
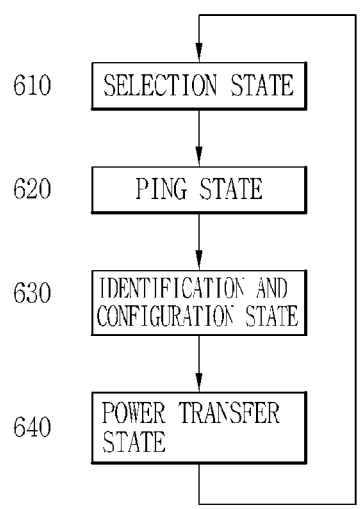

[Fig. 14]
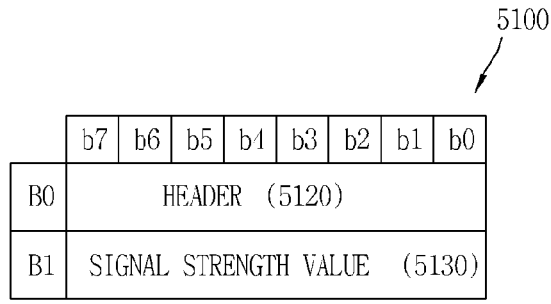
[Fig. 15a]
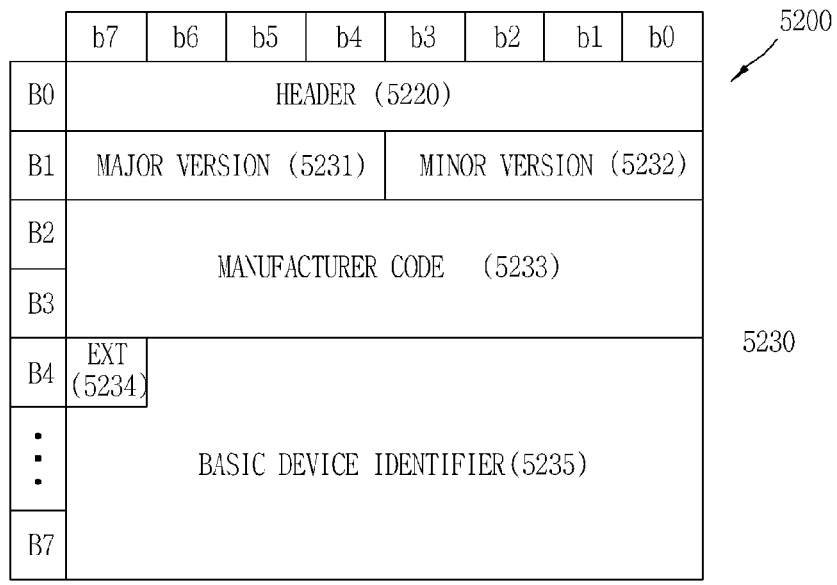
[Fig. 15b]
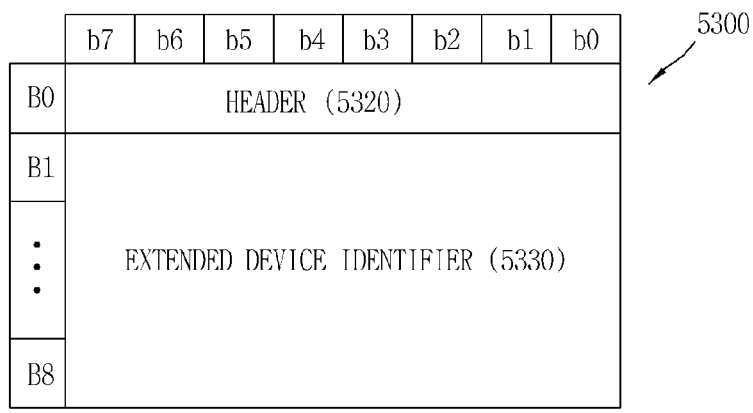

[Fig. 16]
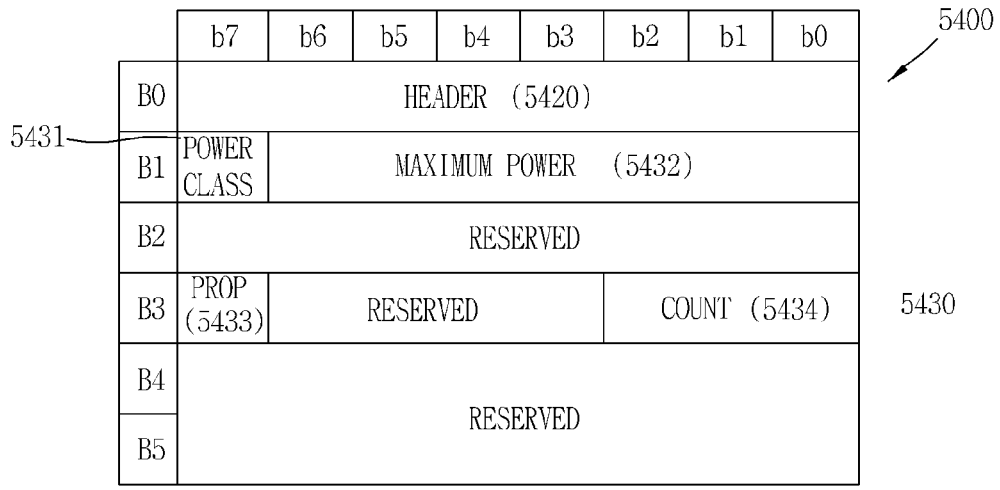
[Fig. 17]
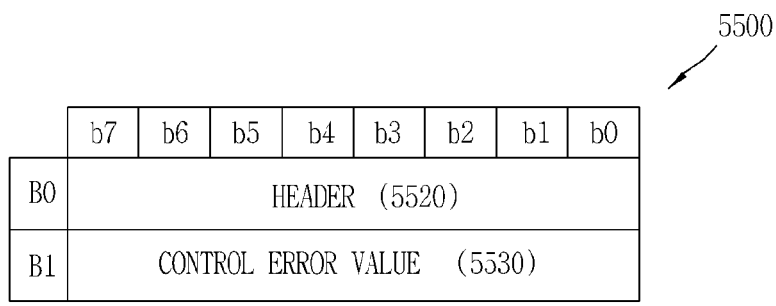
[Fig. 18]
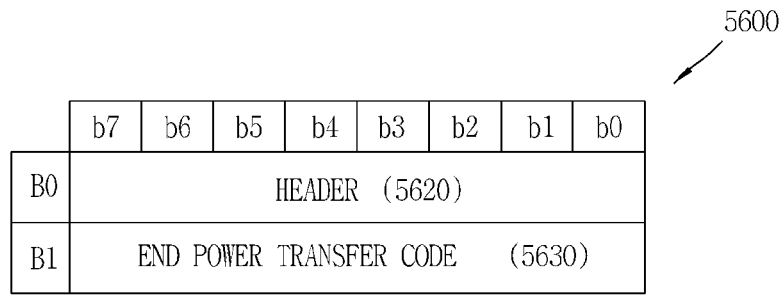

[Fig. 19]
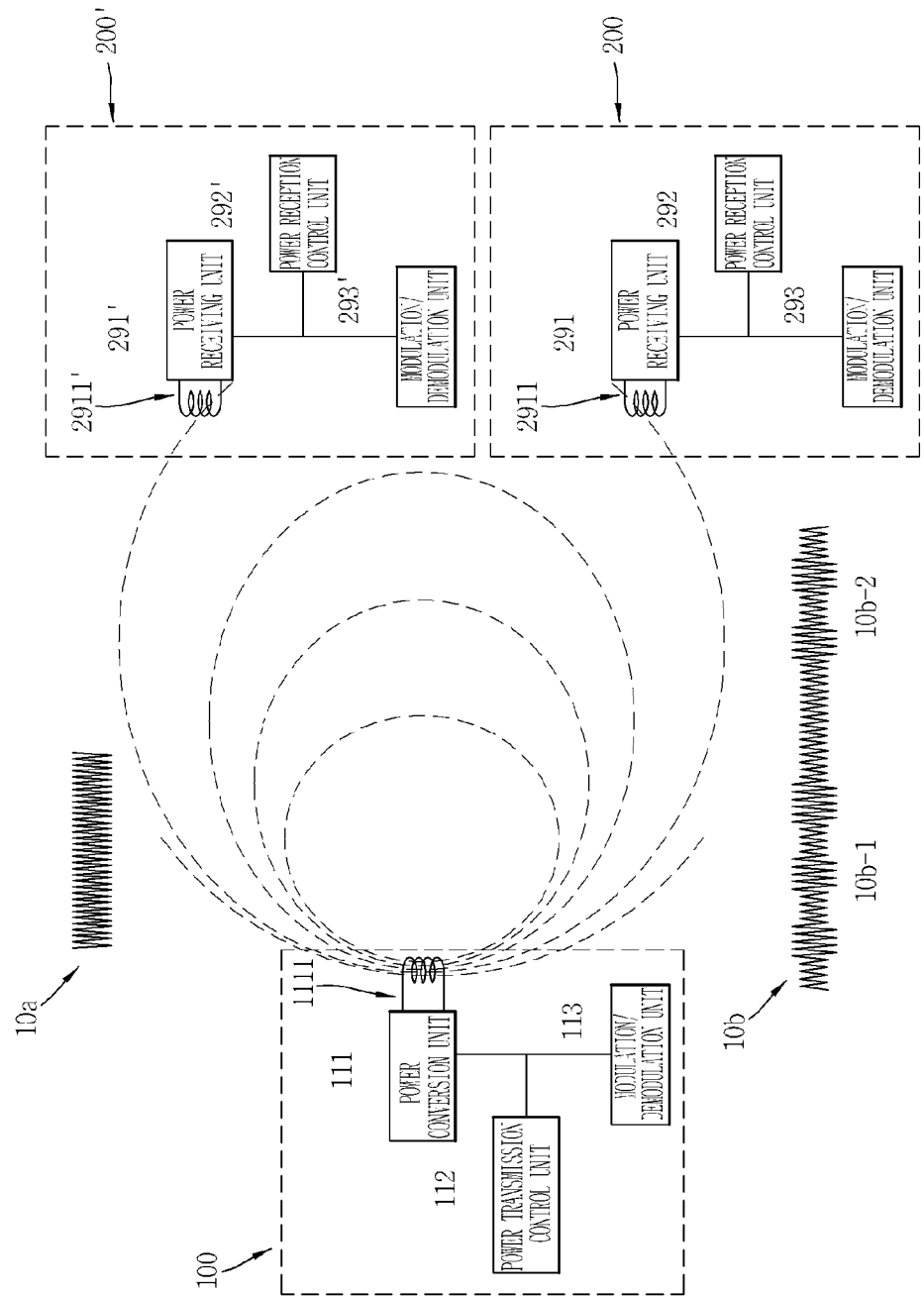
[Fig. 20a]
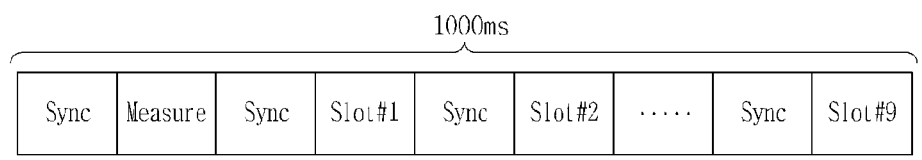

[Fig. 20b]
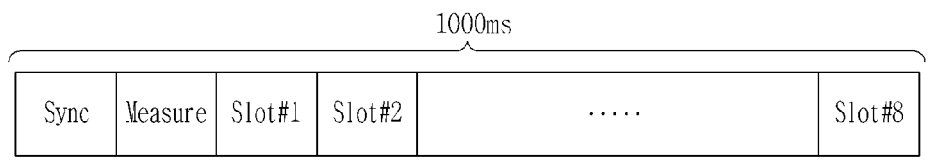
[Fig. 20c]
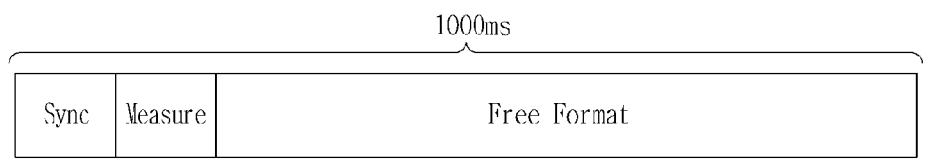
[Fig. 21]
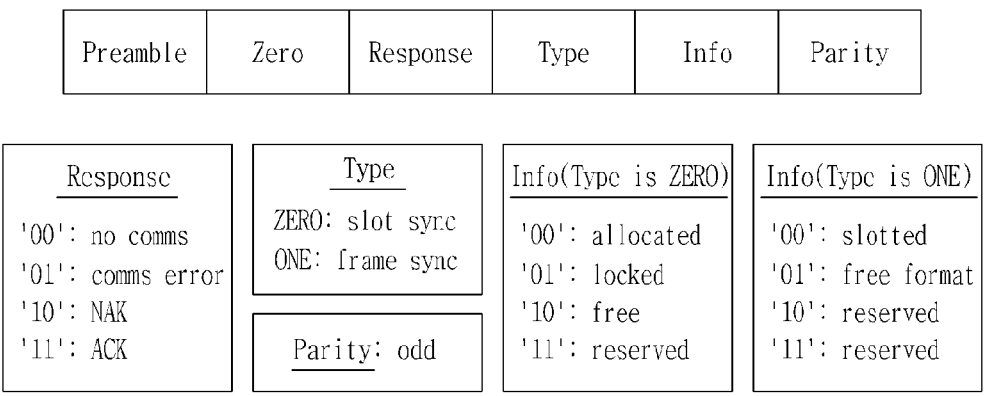

[Fig. 22]
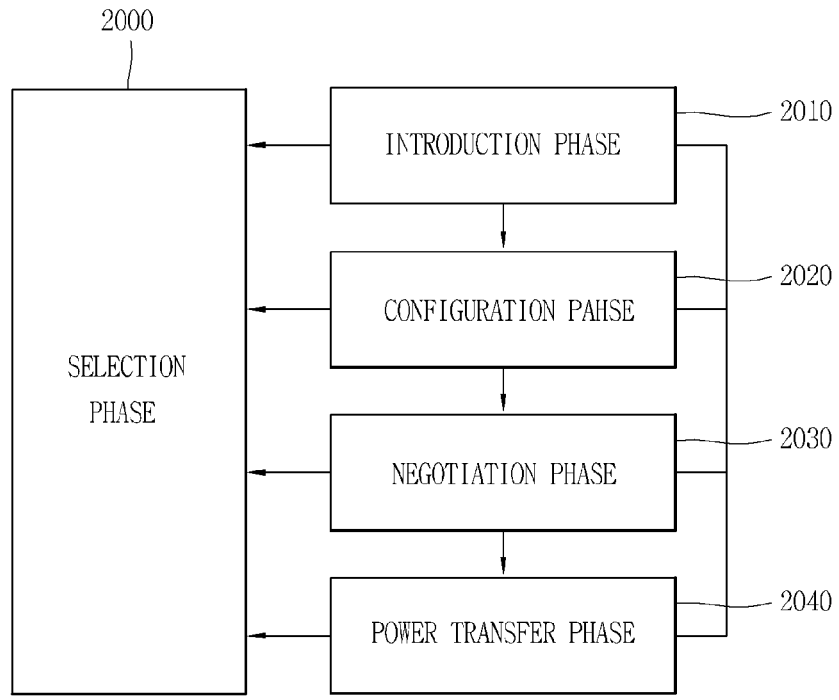
[Fig. 23]
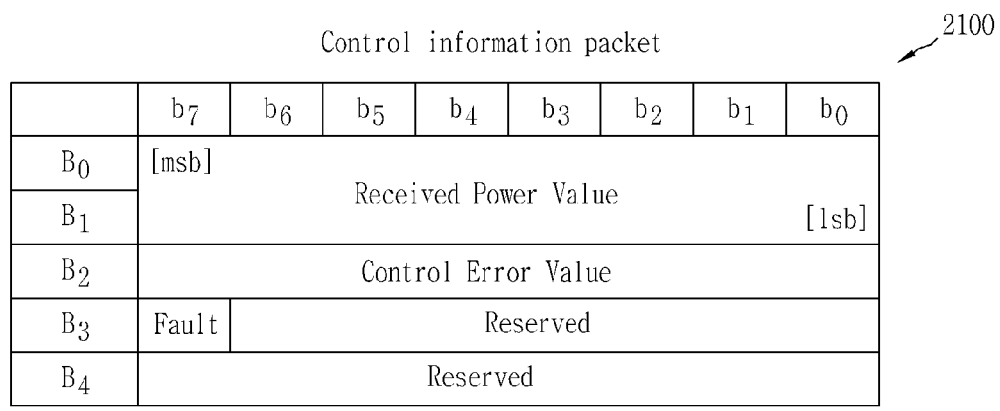

[Fig. 24]

Idenfification data packet 2200

|  | b7 | b6 | b5 | b4 | b3 | b2 | b1 | b0 |
|---|---|---|---|---|---|---|---|---|
| B0 | [msb] | | | | | | | |
| B1 | | | | ID | | | | |
| B2 | | | | | | | | [lsb] |
| B3 | Version | | | | [msb] | | | |
| B4 | CRC | | | | | | | [lsb] |

[Fig. 25]

CFG packet 2700

|  | b7 | b6 | b5 | b4 | b3 | b2 | b1 | b0 |
|---|---|---|---|---|---|---|---|---|
| B0 | Power Class | | Maximum Power | | | | | |
| B1 | Reserved | | | | | | | |
| B2 | Prop | Reserved | | | Zero | Count | | |
| B3 | Window Size | | | | Window Offset | | | |
| B4 | Neg | Pol | Depth | | | Reserved | | |

[Fig. 26]

SRQ packet 2800

|  | b7 | b6 | b5 | b4 | b3 | b2 | b1 | b0 |
|---|---|---|---|---|---|---|---|---|
| B0 | Request | | | | | | | |
| B1 | Request Value | | | | | | | |

[Fig. 27]

EPT Packet 2900

|  | b7 | b6 | b5 | b4 | b3 | b2 | b1 | b0 |
|---|---|---|---|---|---|---|---|---|
| B0 | Slot Number | | | | End Power Transfer Code | | | |

[Fig. 28]
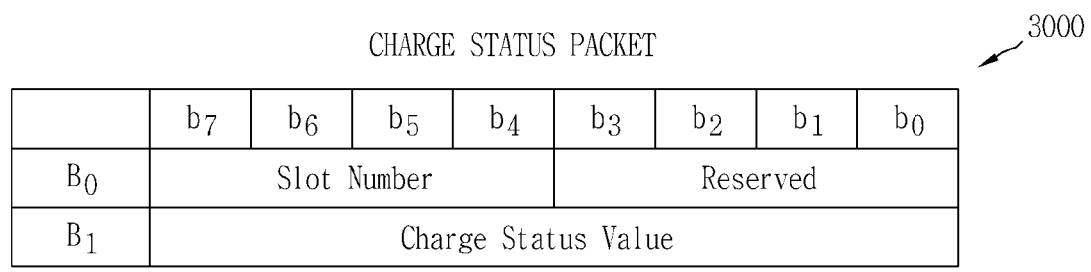

[Fig. 29]

| |
|---|
| no comms slotted |
| Measure |
| no comms free |
| |
| no comms free |
| |
| no comms free |
| |
| no comms free |
| |
| no comms free |
| CI |
| ACK free |
| |
| no comms free |
| |
| no comms free |
| |
| no comms free |
| |

2810 — CI
2820 — ACK free

[Fig. 30]
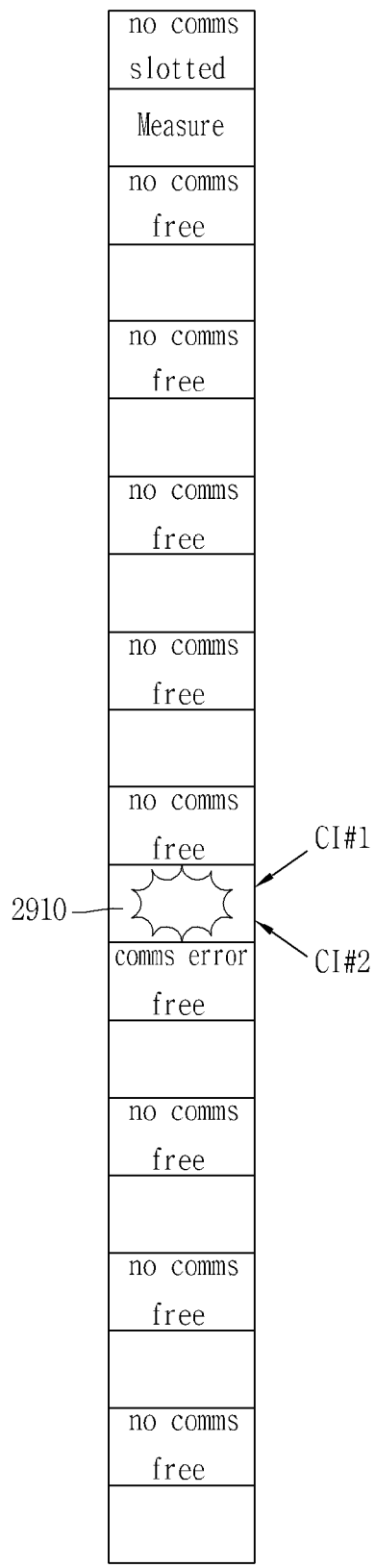

[Fig. 31]
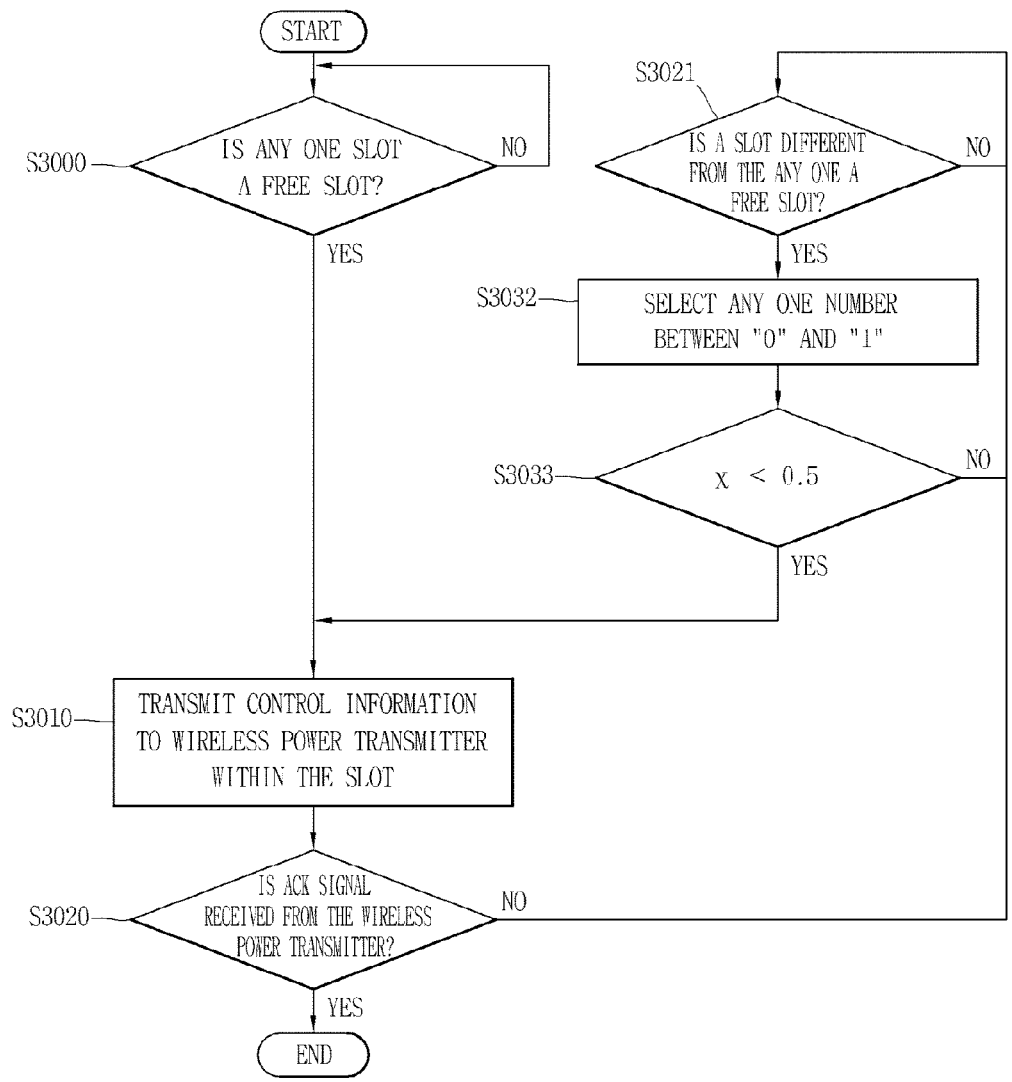

[Fig. 32]
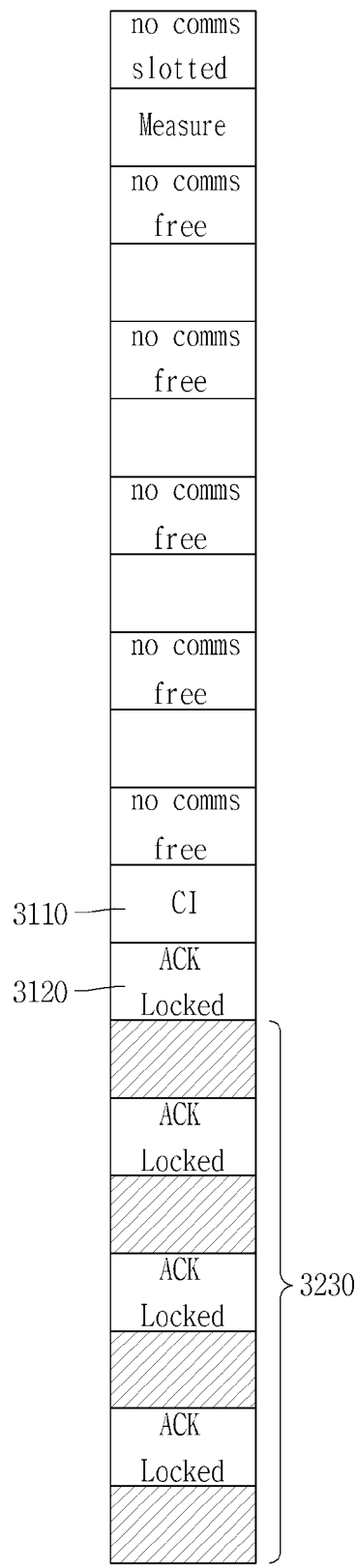

[Fig. 33]
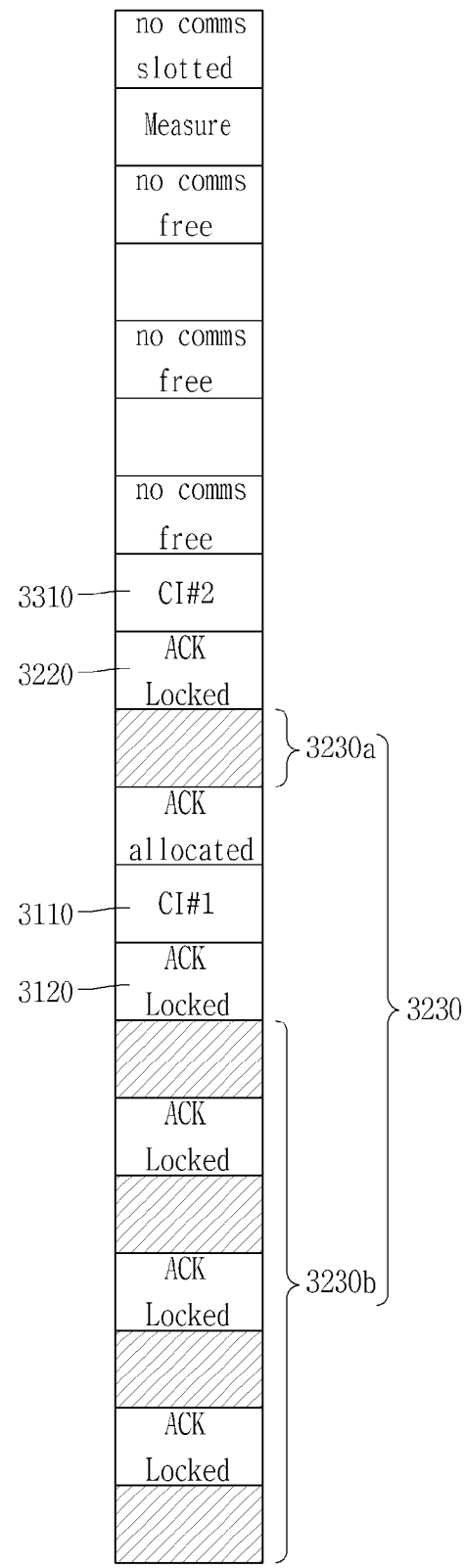

000
WIRELESS POWER TRANSFER METHOD, APPARATUS AND SYSTEM

CROSS-REFERENCE TO RELATED APPLICATIONS

This application is the National Stage filing under 35 U.S.C. 371 of International Application No. PCT/KR2015/005832, filed on Jun. 10, 2015, which claims the benefit of earlier filing date and right of priority to Korean Application No. 10-2015-0046438, filed on Apr. 1, 2015 and also claims the benefit of U.S. Provisional Application Nos. 62/011,867, filed on Jun. 13, 2014 and 62/024,855, filed on Jul. 15, 2014, the contents of which are all hereby incorporated by reference herein in their entirety.

TECHNICAL FIELD

The present disclosure relates to a wireless power transfer method, a wireless power transfer apparatus, and a wireless charging system in a wireless power transfer field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

On the other hand, Power Matters Alliance as another technology standardization consortium has been established in March 2012, developed a product line of interface standards, and published a standard document based on an inductive coupling technology for providing inductive and resonant power.

A wireless charging method using electromagnetic induction is frequently encountered in our lives, for example, is utilized by being commercialized in electric toothbrushes, wireless coffee ports and the like.

On the other hand, the WPC standard prescribes a method of performing communication between a wireless power transmitter and a wireless power receiver. At present, a communication scheme prescribed by the WPC standard, as a one-to-one communication scheme, discloses a scheme in which communication is carried out between one wireless power transmitter and one wireless power receiver.

Accordingly, the present disclosure provides a communication method of a wireless power transmitter for performing communication with a plurality of wireless power receivers as well as said one-to-one communication scheme.

DISCLOSURE OF THE INVENTION

An aspect of the present disclosure is to provide a method of performing communication in a wireless power transmitter performing communication with one or more wireless power receivers.

There is provided a wireless power transmitter for performing communication with a wireless power receiver using a plurality of slots, and the wireless power transmitter may include a power conversion unit configured to transmit a wireless power signal to the wireless power receiver, and a power transmission control unit configured to perform communication with the wireless power receiver using the wireless power signal, wherein the power transmission control unit performs the steps including receiving control information from the wireless power receiver within any one of the plurality of slots, transmitting an ACK signal to the wireless power receiver in response to the control information, and allocating the any one slot to the wireless power receiver to perform communication with the wireless power receiver using the any one slot when the ACK signal is received.

According to an embodiment, the power transmission control unit may transmit the ACK signal to the wireless power receiver based on a collision or non-collision between the wireless power receiver and a wireless power receiver different from the wireless power receiver.

According to an embodiment, the ACK signal may be transmitted to the wireless power receiver when a collision between the wireless power receiver and a wireless power receiver different from the wireless power receiver does not occur, and the ACK signal may not be transmitted to the wireless power receiver when a collision between the wireless power receiver and a wireless power receiver different from the wireless power receiver occurs.

According to an embodiment, a state in which a collision between the wireless power receiver and a wireless power receiver different from the wireless power receiver does not occur may be a state in which only control information of the wireless power receiver is received within the any one slot, and a state in which a collision between the wireless power receiver and a wireless power receiver different from the wireless power receiver occurs may be a state in which control information of the wireless power receiver and control information of the different wireless power receiver are received at the same time within the any one slot.

According to an embodiment, the power transmission control unit may not allocate the any slot to the wireless power receiver when the ACK signal is not transmitted to the wireless power receiver.

According to an embodiment, the power transmission control unit may further include transmitting power to the wireless power receiver subsequent to the allocation of the any one slot, and may receive only control information received from the wireless power receiver within the any one slot while transmitting the power.

According to an embodiment, the power transmission control unit may limit the reception of control information of a wireless power receiver different from the wireless power receiver within the any one slot when the any one slot is allocated.

There is provided a communication method of a wireless power transmitter performing communication with a wireless power receiver using a plurality of slots, and the method may include receiving control information from the wireless power receiver within any one of the plurality of slots, transmitting an ACK signal to the wireless power receiver in response to the control information, and allocating the any one slot to the wireless power receiver to perform communication with the wireless power receiver using the any one slot when the ACK signal is transmitted.

According to an embodiment, the ACK signal may be transmitted to the wireless power receiver based on a collision or non-collision between the wireless power receiver and a wireless power receiver different from the wireless power receiver.

According to an embodiment, the ACK signal may be transmitted to the wireless power receiver when a collision between the wireless power receiver and a wireless power receiver different from the wireless power receiver does not occur, and may not be transmitted to the wireless power receiver when a collision between the wireless power receiver and a wireless power receiver different from the wireless power receiver occurs.

According to an embodiment, a state in which a collision between the wireless power receiver and a wireless power receiver different from the wireless power receiver does not occur may be a state in which only control information of the wireless power receiver is received within the any one slot, and a state in which a collision between the wireless power receiver and a wireless power receiver different from the wireless power receiver occurs may be a state in which control information of the wireless power receiver and control information of the different wireless power receiver are received at the same time within the any one slot.

According to an embodiment, the any one slot may not be allocated to the wireless power receiver when an ACK signal is not transmitted in response to the control information.

According to an embodiment, the method may further include transmitting power to the wireless power receiver subsequent to allocating the any one slot to the wireless power receiver, wherein the control information is continuously received from the wireless power receiver within the any one slot while transmitting the power.

There is provided a wireless power receiver for performing communication with a wireless power transmitter using a plurality of slots, and the wireless power receiver may include a power receiving unit configured with at least one coil for converting a current into a magnetic flux, and formed to generate a wireless power signal, and a power receiving control unit configured to perform communication using the wireless power signal, wherein the power receiving control unit performs the steps including transmitting control information to the wireless power transmitter using any one of the plurality of slots, receiving an ACK signal from the wireless power transmitter in response to the control information, and allocating the any one slot to perform communication with the wireless power transmitter when the ACK signal is received.

According to an embodiment, when an ACK signal is not received in response to control information transmitted to the any one slot, the power receiving control unit may transmit the control information using the remaining slots other than the any one of the plurality of slots until the ACK signal is received.

According to an embodiment, a case where the ACK signal is not received may be a case where control information of the wireless power receiver and control information of a wireless power receiver different from the wireless power receiver are received at the same time within the any one slot.

According to an embodiment, the power receiving control unit may receive power from the wireless power transmitter subsequent to the allocation of the any one slot, and transmit the control information to the wireless power transmitter using the any one slot while receiving the power.

According to an embodiment, the any one slot may be a free slot.

According to an embodiment, the free slot may be a slot allowing the reception of control information from at least one or more wireless power receivers.

There is provided a control method of a wireless power receiver performing communication with a wireless power transmitter using a plurality of slots, and the method may include transmitting control information to the wireless power transmitter using any one of the plurality of slots, receiving an ACK signal from the wireless power transmitter in response to the control information, and allocating the any one slot to perform communication with the wireless power transmitter when the ACK signal is received.

BRIEF DESCRIPTION OF THE DRAWINGS

FIG. 1 is an exemplary view conceptually illustrating a wireless power transmitter and a wireless power receiver according to the embodiments of the present invention.

FIGS. 2A and 2B are exemplary block diagrams illustrating the configuration of a wireless power transmitter and a wireless power receiver that can be employed in the embodiments disclosed herein, respectively.

FIG. 3 is a view illustrating a concept in which power is transferred from a wireless power transmitter to a wireless power receiver in a wireless manner according to an inductive coupling method.

FIGS. 4A and 4B are block diagrams illustrating part of the wireless power transmitter and wireless power receiver in a magnetic induction method that can be employed in the embodiments disclosed herein.

FIG. 5 is a block diagram illustrating a wireless power transmitter configured to have one or more transmitting coils receiving power according to an inductive coupling method that can be employed in the embodiments disclosed herein.

FIG. 6 is a view illustrating a concept in which power is transferred to a wireless power receiver from a wireless power transmitter in a wireless manner according to a resonance coupling method.

FIGS. 7A and 7B are block diagrams illustrating part of the wireless power transmitter and wireless power receiver in a resonance method that can be employed in the embodiments disclosed herein.

FIG. 8 is a block diagram illustrating a wireless power transmitter configured to have one or more transmitting coils receiving power according to a resonance coupling method that can be employed in the embodiments disclosed herein.

FIG. 9 a view illustrating a concept of transmitting and receiving a packet between a wireless power transmitter and an electronic device through the modulation and demodulation of a wireless power signal in transferring power in a wireless manner disclosed herein.

FIG. 10 is a view illustrating a configuration of transmitting and receiving a power control message in transferring power in a wireless manner disclosed herein.

FIGS. 11A, 11B and 11C are views illustrating forms of signals upon modulation and demodulation executed in a wireless power transfer disclosed herein.

FIGS. 12A, 12B and 12C are views illustrating a packet including a power control message used in a wireless power transfer method according to the embodiments disclosed herein.

FIG. 13 is a view illustrating operation phases of the wireless power transmitter and wireless power receiver according to the embodiments disclosed herein.

FIGS. 14 to 18 are views illustrating the structure of packets including a power control message between the wireless power transmitter and the wireless power receiver.

FIG. 19 is a conceptual view illustrating a method of transferring power to at least one wireless power receiver from a wireless power transmitter.

FIGS. 20A, 20B and 20C are structural views illustrating a frame structure for performing communication according to the present disclosure.

FIG. 21 illustrates a sync pattern according to the present disclosure.

FIG. 22 illustrates the operation states of a wireless power transmitter and a wireless power receiver that perform many-to-one communication.

FIG. 23 illustrates a control information packet, and

FIG. 24 illustrates an identification data packet, and

FIG. 25 illustrates a configuration packet, and

FIG. 26 illustrates an SRQ data packet, and

FIG. 27 illustrates an EPT packet, and

FIG. 28 illustrates a charging status packet.

FIGS. 29 and 30 are conceptual views illustrating a method of allocating any one of a plurality of slots to a wireless power receiver.

FIG. 31 is a flow chart illustrating a method of allowing a wireless power receiver to select any one of a plurality of slots.

FIGS. 32 and 33 are conceptual views illustrating a method of allowing a wireless power transmitter and a wireless power receiver to perform start-up so as to allow one or more wireless power receivers to perform communication.

DETAILED DESCRIPTION OF THE PREFERRED EMBODIMENTS

The technologies disclosed herein may be applicable to wireless power transmission (contactless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Here, the transmitter and the receiver indicate the same as a transmitting unit (device) and a receiving unit (device), respectively. Hereinafter, those terms may be used together.

Conceptual view of wireless power transmitter and wireless power receiver

FIG. 1 is an exemplary view conceptually illustrating a wireless power transmitter and a wireless power receiver according to the embodiments of the present invention.

Referring to FIG. 1, the wireless power transmitter 100 may be a power transfer apparatus configured to transfer power required for the wireless power receiver 200 in a wireless manner.

Furthermore, the wireless power transmitter 100 may be a wireless charging apparatus configured to charge a battery of the wireless power receiver 200 by transferring power in a wireless manner. A case where the wireless power transmitter 100 is a wireless charging apparatus will be described later with reference to FIG. 9.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, and a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110 The power transmission control unit 112 may be implemented to be integrated into another control unit (not shown) for controlling the wireless power transmitter 100.

On the other hand, a region to which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may modulate a wireless power signal that has been modulated by the wireless power receiver 200 and use it to receive the power control message.

In addition, the power transmission control unit 112 may acquire a power control message by receiving user data including a power control message by a communication means (not shown) included in the wireless power transmitter 100.

[For Supporting In-band Two-way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting In-band Two-way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the wireless power receiver 200 may include a receiving (Rx) coil 2911*a* being operated as a secondary coil in magnetic induction.

First, the wireless power transmitter 100 and wireless power receiver 200 are disposed in such a manner that the transmitting coil 1111*a* at the side of the wireless power transmitter 100 and the receiving coil at the side of the wireless power receiver 200 are located adjacent to each other. Then, if the power transmission control unit 112 controls a current of the transmitting coil (Tx coil) 1111*a* to be changed, then the power receiving unit 291 controls power to be supplied to the wireless power receiver 200 using an electromotive force induced to the receiving coil (Rx coil) 2911*a*.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911*a* of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

FIG. 4 is a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or more Transmitting Coils

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or one or a combination of more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \qquad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have $L_{TX}$, $C_{TX}$, and may be acquired by using the Equation 1. Here, the wireless power receiver 200 generates resonance when a result of substituting the $L_{RX}$ and $C_{RX}$ of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-band Communication

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two states, a HI phase and a LO phase, and acquire a packet to be transmitted by the wireless power receiver 200 based on digital data classified according to the states.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting In-band Two-way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIG. 12 is a view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous states and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification state 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other states 620, 630, 640.

On the other hand, for the wireless power transmitter 100, a wireless power signal formed to detect an object in the selection phase 610 and a wireless power signal formed to perform digital detection, identification, configuration and power transmission in the subsequent states 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 17. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

Hereinafter, a wireless power transmitter performing many-to-one communication, a control method of the wireless power transmitter performing many-to-one communication, and a wireless charging station (or wireless power transmission system) performing many-to-one communication will be described in more detail with reference to the accompanying drawings.

FIGS. 20A, 20B and 20C are structural views illustrating a frame structure for performing communication according to the present disclosure. Furthermore, FIG. 21 illustrates a sync pattern according to the present disclosure. FIG. 22 illustrates the operation states of a wireless power transmitter and a wireless power receiver that perform many-to-one communication. Furthermore, FIG. 23 illustrates a control information packet, and FIG. 24 illustrates an identification data packet, and FIG. 25 illustrates a configuration packet, and FIG. 26 illustrates an SRQ data packet, and FIG. 27 illustrates an EPT packet.

The wireless power transmitter 100 according to an embodiment of the present disclosure may transmit power in a wireless manner through the power conversion unit 111. Here, the wireless power transmitter 100 may transmit power using at least one of an inductive coupling method and a resonance coupling method.

The power conversion unit 111 of the wireless power transmitter 100 may include a single coil and a plurality of coils. The wireless power transmitter 100 performing a communication method which will be described below may applicable both cases where the power conversion unit 111 is configured with a single coil or plurality of coils.

Furthermore, the power conversion unit 111 may transmit a wireless power signal to perform communication between the wireless power transmitter 100 and the wireless power receiver 200. More specifically, wireless power signal generated from the power conversion unit 111 may be modulated and demodulated through the modulation/demodulation unit 113, and transmitted as a packet to the wireless power receiver. The modulation and demodulation method will be substituted by the earlier description of FIG. 9.

On the other hand, the wireless power transmitter 100 may perform communication with one wireless power receiver or perform communication with a plurality of wireless power receivers.

Here, a method of performing communication with one wireless power receiver may be defined as an exclusive mode, and a method of performing communication with one or more wireless power receivers may be defined as a shared mode. The exclusive mode may have a magnetic field coupling coefficient of 0.3 or above, and the shared mode has a magnetic field coupling coefficient of 0.1 or less.

The wireless power receiver 200 may receive a power signal from the wireless power transmitter 100 when the wireless power receiver 200 is located within a functional area in which the function of the wireless power transmitter 100 is carried out. Here, the wireless power receiver 200 may start the operation as a selection phase based on the wireless power signal.

During the selection phase, the wireless power receiver 200 may operate in either one of an exclusive mode and a shared mode according to whether or not there exists a specific signal within the wireless power signal received from the wireless power transmitter 100. Here, the specific signal may be frequency shift keying (FSK). The FSK signal may be a signal for providing synchronization information and other information to the wireless power receiver.

More specifically, the wireless power receiver 200 may start the operation in the selection phase and then immediately sense the existence of FSK signals within the wireless power signal. If the wireless power receiver 200 detects the FSK signal subsequent to a time point at which the wireless power signal is received and prior to the passage of a predetermined period of time, then the wireless power receiver 200 may carry out an introduction phase of the shared mode. Here, the predetermined period of time may denote a digital ping time of the exclusive mode, for example, 65 ms.

On the contrary, when the wireless power receiver 200 does not detect the FSK signal, the wireless power receiver 200 may operate as an exclusive mode. In this case, the wireless power receiver 200 may carry out the operation phases described in FIG. 13.

Hereinafter, a method of allowing the wireless power receiver 200 to carry out a shared mode will be described in more detail with reference to the accompanying drawings.

As illustrated in FIGS. 20A, 20B and 20C, when the wireless power receiver operates in a shared mode, the wireless power transmitter 100 may provide a plurality of slots (or time slots) to perform communication with one or more wireless power receivers. The slots may be slots having a length suitable to the transmission of data packets in the wireless power receiver.

The plurality of slots may be slots having a fixed length, respectively. Furthermore, the wireless power transmitter 100 may transmit a sync pattern to the wireless power receiver between two consecutive slots of the plurality of slots.

The sync pattern may be transmitted between the plurality of slots to perform the role of separating between the consecutive slots. Furthermore, the sync pattern may perform the role of optimizing communication between the wireless power transmitter 100 and the wireless power receiver. For example, the sync pattern may provide information on a collision occurrence and a secured standby time to the wireless power receiver, thereby performing the optimization of communication.

On the other hand, the plurality of slots may form a frame structure having a fixed length. In other words, the frame may be configured with a plurality of slots.

Here, the frame may denote a communication unit for transmitting and receiving information while transmitting power. The frame may have a preset length. For example, the single frame may have a time interval of 1 sec (1000 ms).

In other words, the wireless power transmitter 100 may perform communication in the unit of frames. In other words, the wireless power transmitter 100 may perform communication through a first frame for one second, and perform communication through a second frame for the following one second subsequent to the passage of the one second.

The frame may be started with a sync pattern. In other words, the sync pattern may exist between frames to perform the role of separating between the frames. Furthermore the sync pattern may be located at the most front side of the frame to perform the role of notifying a start of the frame. In other words, the wireless power receiver may sense a start of the frame through a sync pattern received from the wireless power transmitter. Here, a start bit of the sync pattern may indicate a start of the frame.

Furthermore, the frame may be configured with a slot having a preset time interval (for example, 50 ms) subsequent to the sync pattern. The slot subsequent to the sync pattern may be referred to as a measurement slot or measurement window. The measurement slot may be a slot in which communication between the wireless power transmitter and the wireless power receiver is not carried out, namely, a slot maintained as a free communication slot.

More specifically, the wireless power transmitter may determine power transmitted to the wireless power receiver within the measurement slot. Furthermore, each wireless power receiver may determine an amount of power received by the wireless power receiver itself to transmit the received amount of power to the wireless power transmitter within the measurement slot.

In other words, the wireless power transmitter may recognize an amount of power transmitted to the wireless power receiver through the measurement slot, and control an amount of power to be transmitted afterwards.

In the shared mode below, a sync pattern indicating a start of the frame and the measurement slot may be provided in all frames.

The frame may be configured with various forms. A number of slots constituting the frame, a length of the slots, a length of the frame or the like may be changed by a designer's design. For example, the frame may be configured with 10 slots and 10 sync patterns having the same time interval. For another example, the frame may be configured with 8 slots and 1 sync pattern having the same time interval. For still another example, the frame may be configured with a plurality of slots having different time intervals.

On the other hand, in the shared mode, different types of frames may be used at the same time. For example, a slotted frame having a plurality of slots and a free-format frame with no specific format may be used in the shared mode. More specifically, the slotted frame may be a frame for allowing the transmission of short data packets to the wireless power transmitter 100 and the free-format frame may be a frame that is not provided with a plurality of slots to allow the transmission of long data packets.

On the other hand, the slotted frame and the free-format frame may be changed to various names by those skilled in the art. For example, the slotted frame and the free-format frame may be changed and named a channel frame and a message frame, respectively.

More specifically, referring to FIG. 20A, the slotted frame may include a sync pattern indicating a start of the slot, a measurement slot, nine slots, and an optional sync pattern having the same time interval prior to each of the nine slots. Here, the optional sync pattern is a different sync pattern from the foregoing sync pattern indicating a start of the frame. More specifically, the optional sync pattern may indicate information associated with any adjoining slots (two consecutive slots located at both sides of the sync pattern) without indicating a start of the frame.

In other words, referring to FIG. 20A, a sync pattern may be respectively located between two consecutive slots among the nine slots. In this case, the sync pattern may provide information associated with the two consecutive slots.

Furthermore, the nine slots and sync patterns provided prior to the nine slots, respectively, may have the same time interval. For example, referring to FIG. 20A, the nine slots may have a time interval of 50 ms. In addition, the nine sync patterns may also have a time length of 50 ms.

On the other hand, the slot frame may have a different type from the foregoing description. For example, referring to FIG. 20B, the slot frame may be configured with a sync pattern indicating a start of the slot, a measurement slot and a plurality of slots. In other words, referring to FIG. 20B, the slot frame may have only a sync pattern indicating a start of the frame without having a sync pattern between two consecutive slots.

In this case, the sync pattern indicating a start of the frame may include status information of a plurality of slots constituting the slot frame. For example, the sync pattern may include information on whether or not each of the plurality of slots is allocated to a wireless power receiver.

Furthermore, referring to FIG. 20B, the slot frame may be configured with slots having the same time interval. Here, the time interval of the slots may be determined by a number of wireless power receivers that can be charged by the wireless power transmitter 100 at the same time. For example, when the wireless power transmitter 100 is able to transfer power to eight wireless power receivers at the same time, one slot may have a time interval of 125 ms.

On the other hand, referring to FIG. 20B, even without having a sync pattern between slots, the wireless power transmitter 100 may transmit information indicating the status of adjoining slots to the wireless power receiver between the slots. For example, information indicating the status of the slots may be a slot occupied indicator (SOI), a start-up slot indicator (SSI), a slot free indicator (SFI), information on whether or not communication from the wireless power receiver is efficiently carried out within a slot (ACK, NAK, no communication signal, communication error signal) or the like.

In other words, the slot frame may transmit information between adjoining slots to the wireless power receiver regardless of whether or not a sync pattern is provided between slots. In other words, the wireless power transmitter 100 may provide the information in the form of a sync pattern or sync bit to the wireless power receiver. Through this, the wireless power receiver may know the status information of each slot to efficiently perform communication with the wireless power transmitter.

The following description may be all applicable to the slot frame in the similar manner regardless of the type of the slot frame.

A plurality of slots constituting the slot frame may be provided to perform communication between one wireless power transmitter and one or more wireless power receivers.

The plurality of slots may be configured with at least one of an allocated slot, a free slot, a measurement slot and a locked slot.

The allocated slot may be a slot used by a specific wireless power receiver. More specifically, other wireless power receivers other than the specific wireless power receiver may be limited to transmit information to the wireless power transmitter within a slot allocated to the specific wireless power receiver.

The free slot may be a slot that is freely used by any wireless power receiver. In other words, the free slot may be a slot provided for any wireless power receiver to transmit information to the wireless power transmitter within the free slot.

The measurement slot is a slot in which communication with the wireless power receiver is not carried out to measure power that has been transmitted and received. More specifically, the measurement slot may be a slot provided to transmit and receive power information between the wireless power transmitter and the wireless power receiver.

The locked slot may be a slot that is temporarily locked to be used by a specific wireless power receiver. More specifically, the locked slot may be a slot in which only a specific wireless power receiver can access during a start-up sequence to allow the specific wireless power receiver to perform the start-up sequence. The start-up sequence will be described below in more detail.

The locked slot may be limited to access other wireless power receivers other than the specific wireless power receiver. In other words, the other wireless power receivers may be limited to transmit information within the locked slot in a state that the locked slot is provided.

On the other hand, the locked slot may be a temporarily provided, and thus when the start-up sequence of the specific wireless power receiver is completed, it may be provided as a free slot again.

Each of the plurality of slots may have a limited time length. For example, each of the plurality of slots may have a time length of 50 ms. Since the each slot has 50 ms, the wireless power receiver can transmit data of approximately 5 bytes for each slot.

The structure of the slot frame may be easily changed by those skilled in the art, and the following description of a communication scheme may be carried out in the same manner regardless of the structure of the slot frame.

Furthermore, referring to FIG. 20C, the free type frame may not have a specific form other than a sync pattern indicating a start of the frame and a measurement slot. In other words, the free type frame is to perform a different role from the slot frame, and for example, may be used to perform communication of long data packets (for example, optionally proprietary information packets) between the wireless power transmitter and wireless power receiver or perform the role of selecting any one of a plurality of coils in the wireless power transmitter configured with the plurality of coils.

In the above, frame structures have been described.

Hereinafter, a sync pattern contained in each frame will be described in more detail with reference to the accompanying drawings.

As a signal containing the information of slots, the sync pattern may be implemented in various forms. For example, the sync pattern may be implemented with a pattern or packet.

Furthermore, at least one or more sync patterns may exist in the frame structure. For example, the sync pattern may be provided at a front side of each slot or provided only at the most front side of the frame. For example, the sync pattern may be provided at the most front of the frame and between each slot. For another example, the sync pattern may be provided only at the most front side of the frame within the frame configured with a plurality of slots.

The sync pattern may include various information. For example, the sync pattern may include status information of a slot, status information of a frame, a structure of frame, communication execution status information, and the like.

For example, referring to FIG. 21, the sync pattern may be configured with a preamble, a start bit, a response field, a type field, an info field, and a parity bit. In FIG. 21, the start bit is illustrated as ZERO.

More specifically, the preamble may be configured with consecutive bits, and set to all "0" s. In other words, the preamble may be bits for adjusting a time length of the sync pattern.

The number of bits constituting the preamble may dependent on an operating frequency such that the length of a sync pattern is the closest to 50 ms but within a range not exceeding 50 ms. For example, the sync pattern is configured with two preamble bits when the operating frequency is 100 kHz, and configured with three preamble bits when the operating frequency is 105 kHz.

As a bit subsequent to the preamble, the start bit may denote ZERO. The ZERO may be a bit indicating the type of sync pattern. Here, the type of sync pattern may include a frame sync including information associated with a frame and a slot sync including the information of a slot. In other words, the sync pattern may be a frame sync located between consecutive frames to indicate a start of the frame or a slot sync located between consecutive slots among a plurality of slots to include information associated with the consecutive slots. For example, it may denote a slot sync in which the relevant slot is located between slots when the ZERO is "0", and denote a frame sync in which the relevant sync pattern is located frames when the ZERO is "1".

As the last bit of a sync pattern, the parity bit may indicate the data fields (i.e., a response field, a type field, an information field) of the sync pattern. For example, the parity bit may be "1" if the number of bits constituting the data fields of the sync pattern is an even number, and "0" otherwise (i.e., odd number).

The response field may include the response information of the wireless power transmitter with regard to communication with the wireless power receiver within a slot prior to the sync pattern. For example, the response field may have "00" when the execution of communication with the wireless power receiver is not sensed. Furthermore, the response field may have "01" when a communication error is sensed while communicating with the wireless power receiver. The communication error may be a case where a collision between two or more wireless power receivers occurs when the two or more wireless power receivers attempt to access one slot.

Furthermore, the response field may include information indicating whether or not a data packet is correctly received from the wireless power receiver. More specifically, the response field may be "10" (not acknowledge, NAK) if the wireless power transmitter denies the data packet, and "11" (acknowledge, ACK) when the wireless power transmitter confirms the data packet.

The type field may indicate a type of sync pattern. More specifically, the type field may have "1" indicating a frame sync when the sync pattern is a first sync pattern of the frame (i.e., when located prior to a measurement slot as a first sync pattern of the frame).

Furthermore, the type field may have "0" indicating a slot sync when the sync pattern is not a first sync pattern of the frame.

Furthermore, the information field may determine the meaning of its value according to the type of sync pattern indicated by the type field. For example, the meaning of the information field may indicate a type of frame when the type field is "1" (i.e., when indicates a frame sync). In other words, the information field may indicate whether or not a current frame is a slotted frame or free-format frame. For example, it may indicate a slot frame if the information field is "00", and a free-format frame if the information field is "01".

On the contrary, when the type field is "0" (i.e., slot sync), the information field may indicate the status of a next slot located subsequent to the sync pattern. More specifically, the information field may have "00" if the next slot is a slot allocated to a specific wireless power receiver, "01" when it is a locked slot to be temporarily used by the specific wireless power receiver, or "10" when it is a slot to be freely used by any wireless power receiver.

In the above, the structure of a sync pattern has been described.

Hereinafter, the operating phase of the wireless power receiver in a shared mode will be described in more detail.

Referring to FIG. 22, the wireless power receiver operated in a shared mode may operate in any one of a selection phase 2000, an introduction phase 2010, a configuration phase 2020, a negotiation phase 2030 and a power transfer phase 2040.

First, the wireless power transmitter 100 according to an embodiment of the present disclosure may transmit a wireless power signal to sense the wireless power receiver. In other words, as described above in FIG. 13, the process of sensing the wireless power receiver using such a wireless power signal may be referred to as analog ping.

On the other hand, the wireless power receiver that has received the wireless power signal may enter the selection phase 2000. The wireless power receiver that has entered the selection phase 2000 may sense the existence of a FSK signal on the wireless power signal as described above.

In other words, the wireless power receiver may perform communication in any one of an exclusive mode and a shared mode according to the existence or non-existence of the FSK signal.

More specifically, the wireless power receiver operates in a shared mode if a FSK signal is included in the wireless power signal, and otherwise operates in an exclusive mode.

If the wireless power receiver operates in an exclusive mode, then the wireless power receiver may carry out the operation phases described in FIG. 13.

If the wireless power receiver operates in a shared mode, then the wireless power receiver may enter the introduction phase 2010. During the introduction phase 2010, the wireless power receiver may transmit a control information packet to the wireless power transmitter to transmit the control information (CI) packet 2100 during the configuration phase, negotiation phase and power transfer phase. The control information packet may have a header and information associated with control. For example, the header may be "0x53" in the control information packet.

Referring to FIG. 23, the control information (CI) packet 2100 may include power value information received by the wireless power receiver (received power value), control error value information on power transfer (control error value), power transfer stop request information (fault), and the like.

Here, the wireless power transmitter 100 may control an amount of power transmitted to the wireless power receiver based on the control information (CI) packet. For example, as control error information increases or decreases, the wireless power transmitter 100 may increase or decrease the amount of current of a coil constituting the power conversion unit 111 of the wireless power transmitter. For another example, the wireless power transmitter may use the received power value information as an average value of the measurement slot.

On the other hand, the wireless power transmitter 100 may receive the control information (CI) packet from the wireless power receiver within any one of the plurality of slots. For example, the wireless power transmitter may receive the control information from the wireless power receiver within a first slot among the plurality of slots of the first frame.

The wireless power transmitter 100 may transmit an acknowledge (ACK) signal when the first slot is available, and transmit a not-acknowledge (NAK) signal when the first slot is not available.

More specifically, the wireless power transmitter 100 may transmit an ACK signal to the wireless power receiver when the control information packet is successfully received within the first slot, and transmit a NAK signal when the wireless power receiver that has transmitted the control information (CI) packet and another wireless power receiver carry out the configuration phase 2020 or negotiation phase 2030 within the first slot.

If an ACK signal is transmitted to the wireless power receiver, then the wireless power transmitter 100 may allocate the first slot to the wireless power receiver. Here, the wireless power receiver may transmit a control information (CI) packet using the allocated first slot during the configuration phase 2020, negotiation phase 2030 and power transfer phase 2040. In other words, when the ACK signal is received, the wireless power receiver may always transmit a control information (CI) packet regardless of the operation phase of the wireless power receiver.

On the contrary, when a NAK signal is transmitted to the wireless power receiver, the wireless power transmitter 100 may not allocate the first slot to the wireless power receiver. Here, the wireless power receiver to which the first slot is not allocated may transmit the control information (CI) packet again within any one of the remaining slots other than the first slot until receiving an ACK signal.

On the other hand, the wireless power transmitter 100 may transmit an ACK signal to provide locked slots for the exclusive use of the wireless power receiver when the wireless power receiver is allowed to enter the configuration phase 2020. More specifically, the wireless power transmitter 100 may provide locked slots to the wireless power receiver in which their access is limited to other wireless power receivers other than the wireless power receiver. In this case, the wireless power receiver may carry out the configuration phase and negotiation phase without any collision with the other wireless power receivers using the locked slots.

The configuration phase 2020 may be a phase in which the wireless power receiver transmits information associated with the configuration phase 2020 to allow the wireless power receiver to efficiently receive power. More specifically, the configuration phase 2020 may be a phase in which the identification information of the wireless power receiver is provided to the wireless power transmitter 100 to allow the wireless power transmitter 100 to identify each wireless power receiver in a shared mode.

In other words, during the configuration phase 2020, the wireless power transmitter 100 may receive information associated with the configuration phase 2020 from the wireless power receiver within the locked slots. Here, information associated with the configuration phase 2020 may include identification data packets, optionally proprietary data packets, configuration (CFG) packets, and the like.

Referring to FIG. 24, the identification data packets may include an IDHI packet and an IDLO packet. The header of the IDHI packet may have "0x54" and the header of the IDLO packet may have "0x55". Furthermore, the identification data packets may include unique identification (ID) information for the identification of the wireless power receiver, version information of a wireless power transfer contract used for the wireless power receiver, and cyclic redundancy check (CRC) information for determining an error of the identification information.

As data packets above 5 bytes, optionally proprietary data packets may be received at the wireless power receiver through a free-format frame. As information associated with the proprietorship of the wireless power receiver, the optionally proprietary data packets may be manufacturer information of the wireless power receiver or the like.

Referring to FIG. 25, the configuration (CFG) packet 2700 may include count information including a number of optional data packets, depth information including a scaling factor for calculating a FSK modulation depth, maximum power information, power class information of the wireless power receiver indicating any one of power levels, low power, medium power and high power, negotiation (Neg) information provided only in an exclusive mode, an indicator (prop) indicating a method of determining a current of a major cell at the side of the wireless power transmitter, polarity information (pol) of a FSK signal, window offset information, and the like.

The wireless power transmitter may respond to the wireless power receiver using any one of an ACK signal, a NAK signal, a no communication signal and a communication error signal.

More specifically, the wireless power transmitter may transmit a NAK signal to the wireless power receiver when a cyclic redundancy check (CRC) error is sensed on the identification data packets (IDHI, IDLO), and otherwise transmit an ACK signal.

On the other hand, when the wireless power receiver returns to the configuration phase 2020 again from the power transfer phase 2040 based on reconfiguration request information (EPT/reconfigure packet) to reconfigure a power transfer contract, the identification data packets may be transmitted or not transmitted to the wireless power transmitter 100.

Furthermore, when the optionally proprietary data packets cannot be recognized since they differ from preset data, the wireless power transmitter may transmit a NAK signal to the wireless power receiver, and otherwise transmit an ACK signal or NAK signal with respect to specific proprietary data packets in an appropriate manner. Meanwhile, in order to receive the optionally proprietary data packets, the wireless power receiver may transmit insert free-format frame information for requesting a free-format frame to the wireless power transmitter to use the free-format frame.

Furthermore, when a configuration (CFG) packet is received, the wireless power transmitter may transmit an ACK signal in response to information included in the configuration packet.

If the wireless power transmitter transmits the no communication signal or communication error signal with respect to information associated with the configuration phase 2020, then the wireless power receiver may retransmit a data packet that has received the no communication signal or communication error signal.

The wireless power receiver may receives information associated with the configuration phase 2020, and then enter the negotiation phase 2030. In other words, when a configuration (CFG) packet is received during the configuration phase 2020, the wireless power transmitter 100 may be allowed to enter the negotiation phase 2030.

The negotiation phase 2030 may be a phase in which the wireless power receiver transmits information associated with the negotiation phase 2030 to the wireless power transmitter 100 to effectively transfer power to the wireless power receiver. More specifically, the negotiation phase 2030 may be a phase in which the wireless power receiver provides power information to be transmitted to the wireless power receiver to the wireless power transmitter in a shared mode.

Here, the wireless power transmitter 100 may continuously provide locked slots provided during the configuration phase 2020 even during the negotiation phase 2030. In other words, the wireless power transmitter 100 may provide the locked slots, thereby securing the progress of the negotiation phase 2030 without any collision between the wireless power receiver and other wireless power receivers.

The wireless power receiver may transmit information associated with the negotiation phase 2030 using the locked slots. In other words, the wireless power transmitter 100 may receive information associated with the negotiation phase 2030 from the wireless power receiver within the locked slots.

Here, the information associated with the negotiation phase 2030 may include optionally proprietary data packets, negotiation data packets, and an end negotiation phase request (SRQ/en, end-negotiation) packet. The negotiation data packets may include specific request (SRQ) packets and general request (GRQ) packets.

Referring to FIG. 26, the SRQ packet 2800 may include request ground information and request value information. Here, the request ground information may be any one of end negotiation information, guaranteed power information, received power packet type information, modulation depth information, maximum power information, and insert free-format frame information. The request value information may include parameter information determined by the request ground information.

The end negotiation phase request packet may include information on requesting the end of the negotiation phase 2030. When the end negotiation phase request packet is transmitted, the wireless power receiver may end the negotiation phase 2030 and enter the power transfer phase 2040.

When information associated with the negotiation phase 2030 is received, the wireless power transmitter 100 may respond to the wireless power receiver using any one of an ACK signal, a NAK signal, a no communication signal and a communication error signal.

More specifically, the wireless power transmitter 100 may transmit an ACK signal or NAK signal to the wireless power receiver with respect to the negotiation data packet.

Furthermore, when the optionally proprietary data packets cannot be recognized since they differ from preset data, the wireless power transmitter may transmit a NAK signal to the wireless power receiver, and otherwise transmit an ACK signal or NAK signal in an appropriate manner.

Furthermore, when the no communication signal or communication error signal is received with respect to information associated with the negotiation phase 2030, the wireless power transmitter 100 may retransmit data that has received the no communication signal or communication error signal.

On the other hand, when the reception of the information associated with the negotiation phase 2030 is completed, the wireless power transmitter 100 may enter the power transfer phase 2040. For example, when end negotiation phase request packet (SRQ/en) is received, the wireless power transmitter 100 may transmit an ACK signal, and the wireless power receiver may enter the power transfer phase 2040.

Here, when the negotiation phase 2030 is completed, the wireless power transmitter 100 may suspend the provision of the locked slots to the wireless power receiver.

The power transfer phase 2040 may denote a phase of transmitting power in a wireless manner. The wireless power receiver may continuously transmit a control information (CI) packet through the allocated first slot during the power transfer phase 2040. Furthermore, the wireless power receiver may freely transmit one or more data packets using free slots among a plurality of slots.

More specifically, the wireless power receiver may transmit an end power transfer packet, a charge status packet (CHS2), and proprietary data packets during the power transfer phase 2040.

Referring to FIG. 27, the end power transfer packet 2900 may include request information and slot information of the end power transfer packet. The request information of the end power transfer packet may include any one of charging complete information, internal fault information indicating a software or logic error, over-temperature information, over voltage information, over current information, battery failure information indicating a battery defect, reconfigure request information, no response information indicating no response to a control information packet or control error packet, renegotiate request information, and unknown information. The slot information may include number information of a slot allocated to the wireless power receiver.

Referring to FIG. 28, the charge status packet may include charge status information and slot information. The charge status information may be information of a current charging amount of the wireless power receiver. For example, the charging status information may be charging percentage information. The slot information may include numeral information of a slot allocated to the wireless power receiver.

As data packets optionally generated from the wireless power receiver, the proprietary data packets may include manufacturer information or the like of the wireless power receiver, for example.

On the other hand, the wireless power transmitter 100 may control the wireless power receiver based on end power transfer packet information to the wireless power receiver. For example, when reconfigure request information is included in the end power transfer packet, the wireless power receiver may return to the configuration phase 2020 again from the power transfer phase 2040.

In the above, the operation phases of the wireless power receiver in a shared mode have been described.

Hereinafter, a method of performing communication between at least one wireless power receiver and a wireless power transmitter will be described with reference to the accompanying drawings. FIGS. 29 and 30 are conceptual views illustrating a method of allocating any one of a plurality of slots to a wireless power receiver. FIG. 31 is a flow chart illustrating a method of allowing a wireless power receiver to select any one of a plurality of slots.

A wireless power transmitter according to the present disclosure may include a power conversion unit 111 configured to transmit a wireless power signal and a power transmission control unit 112 configured to control the power conversion unit 111.

The power conversion unit 111 may be configured with at least one coil for converting a current into a magnetic flux or converting a magnetic flux into a current to generate a wireless power signal. Here, the wireless power signal generated from the power conversion unit 111 may be modulated and demodulated, and used for communication between the wireless power transmitter and the wireless power receiver.

When operated in a shared mode, the power transmission control unit 112 may perform communication with the one or more wireless power receivers using a plurality of slots.

First, the power transmission control unit 112 may receive specific information (or first packet) from any one wireless power receiver of the one or more wireless power receivers within any one of the plurality of slots to perform communication with the wireless power receiver.

The specific information (or first packet) may be any one of signal strength (SS) packet, identification (ID) packet, and control information (CI) packet.

The specific information may be transmitted to the power transmitter as a first data in the start-up sequence of the power receivers. Also, the specific information is used as identification information of the power receivers.

The signal strength (SS) packet may indicate signal strength between the wireless power transmitter and the wireless power receiver. For example, the signal strength packet may include coupling coefficient information between the wireless power transmitter and the wireless power receiver.

The identification (ID) packet may include information for identifying the wireless power receiver. For example, the identification packet may be a serial number of the wireless power receiver.

The control information (CI) packet may include received power information and control error value information.

The power transmission control unit 112 may determine whether or not to transmit an ACK signal to the wireless power receiver based on a collision or non-collision between the any one wireless power receiver and a wireless power receiver different from the any one wireless power receiver within the any one slot.

More specifically, when the specific information is received without a collision between the any one wireless power receiver and one wireless power receiver different from the any one wireless power receiver, the power transmission control unit 112 may transmit an ACK signal to the any one wireless power receiver. For example, referring to FIG. 29, when a collision does not occur from the any one wireless power receiver, the power transmission control unit 112 may receive specific information without the collision within any one 2810 of a plurality of slots. Here, the power transmission control unit 112 may transmit an ACK signal 2820 in response to the specific information.

On the contrary, when a collision occurs between the any one wireless power receiver and a wireless power receiver different from the any one wireless power receiver, the power transmission control unit 112 may receive the specific information along with the collision within the any one slot. Here, the power transmission control unit 112 may not transmit the ACK signal 2820 to the any one wireless power receiver.

A case where a collision does not occur between the any one wireless power receiver and a wireless power receiver different from the any one wireless power receiver may be a case where only control information of the any one wireless power receiver is transmitted within the any one slot.

On the contrary, a case where a collision occurs between the any one wireless power receiver and a wireless power receiver different from the any one wireless power receiver may be either one of a case where the specific information is received within the any one slot in a state that one wireless power receiver different from the any one wireless power receiver carries out the configuration phase 2020 and negotiation phase 2030 and a case where control information of the any one wireless power receiver and control information of the different one wireless power receiver are received at the same time within the any one slot.

Furthermore, when the collision occurs, the power transmission control unit 112 may transmit a communication error signal or NAK signal.

For example, when specific information is received from the any one wireless power receiver within the any one slot while a wireless power receiver different from the any one wireless power receiver is carrying out the configuration phase 2020 and negotiation phase 2030, the power transmission control unit 112 may transmit a NAK signal to the any one wireless power receiver.

For another example, referring to FIG. 30, when specific information of the any one wireless power transmitter and control information of the different one wireless power receiver are received at the same time within the any one slot 2910, the power transmission control unit 112 may transmit a communication error signal to the any one wireless power receiver and the different one wireless power receiver.

When an ACK signal is transmitted to the any one wireless power transmitter, the power transmission control unit 112 may allocate the any one slot to the any one wireless power receiver.

The allocation of the slot may denote setting the slot to receive only information transmitted by the wireless power receiver allocated to the slot. In this case, the reception of information transmitted from a different wireless power receiver other than the any one wireless power receiver may be limited within the allocated slot.

On the contrary, when an ACK signal is not transmitted to the any one wireless power receiver, the power transmission control unit 112 may not allocate the any one slot to the any one wireless power receiver.

In this case, the any one wireless power receiver may transmit specific information to the wireless power receiver until the ACK signal is received.

Hereinafter, a method of transmitting specific information to the wireless power transmitter until the ACK signal is received will be described.

The any one wireless power receiver may include a power receiving unit 201 and a power receiving control unit 292 configured with at least one coil formed to receive a wireless power signal.

The power receiving control unit 292 may select any one of a plurality of slots to perform communication with the wireless power transmitter. Furthermore, the power receiving control unit 292 may determine whether or not the any one slot is a free slot (S3000).

When the selected any one slot is a free slot, the power receiving control unit 292 may transmit specific information to the wireless power transmitter using the any one slot (S3010). On the contrary, when the selected any one slot is not a free slot, the power receiving control unit 292 may select one slot different from the any one of the plurality of slots. Furthermore, the power receiving control unit 292 may transmit the specific information to the wireless power transmitter using the any one slot.

The free slot may be a slot for allowing the any one wireless power receiver and a wireless power receiver different from the any one wireless power receiver to freely transmit information as described above.

The power receiving control unit 292 may determine whether or not an ACK signal is received from the wireless power receiver in response to specific information subsequent to transmitting the specific information to the wireless power transmitter within the any one slot (S3020).

As a result of the determination, when it is determined that the ACK signal is received in response to the specific information, the power receiving control unit 292 may perform communication with the wireless power transmitter using the any one slot.

As a result of the determination, when the ACK signal is not received in response to the specific information, the power receiving control unit 292 may transmit specific information to the wireless power transmitter until the ACK signal is received.

More specifically, unless the ACK signal is received, the power receiving control unit 292 may select a slot different from the any one of the plurality of slots. Furthermore, the power receiving control unit 292 may determine whether or not the different one slot is a free slot (S3021).

As a result of the determination, when the different one slot is not a free slot, the power receiving control unit 292 may select a slot different from the different one slot among the plurality of slots. In other words, the power receiving control unit 292 may continuously select any one of the plurality of slots until the selected slot becomes a free slot.

As a result of the determination, when the different one slot is a free slot, the power receiving control unit 292 may select any one number in a random manner. For example, the power receiving control unit 292 may any one number among values between "0" to "1".

Here, when the selected number is less than a preset value, the power receiving control unit 292 may carry out the steps of transmitting specific information to the wireless power transmitter (S3010) and determining whether or not an ACK signal is received (S3020) again within the any one slot. For example, referring to FIG. 31, the power receiving control unit 292 may carry out the step of S3010 when the selected number is less than 0.5.

On the contrary, when the selected number is above a preset value, the power receiving control unit 292 may carry out the step of selecting a slot different from the any one of the plurality of slots (S3021) again.

In other words, the power receiving control unit 292 may continuously transmit specific information to the wireless power transmitter until any one of the plurality of slots is allocated.

On the other hand, the power transmission control unit 112 may control the power conversion unit 111 to transmit power to the any one wireless power receiver subsequent to allocating the any one slot to the wireless power receiver. The power conversion unit 111 may be configured with at least one coil for converting a current into a magnetic flux and generating a wireless power signal.

Here, the power transmission control unit 112 may receive a control information (CI) packet from the any one wireless power receiver within the any one slot while transmitting the power to the any one wireless power receiver.

Through this, the wireless power transmitter may continuously receive control information associated with the transmission of power from the wireless power receiver while transmitting power to the wireless power receiver.

In the above, a method of allowing a wireless power transmitter to allocate a slot to a wireless power receiver has been described. Through this, a wireless power transmitter according to the present disclosure may perform communication with one or more wireless power receivers.

Hereinafter, a method of allowing a wireless power transmitter and a wireless power receiver to perform communication start-up so as to allow one or more wireless power receivers to perform communication in a wireless charging system will be described. FIGS. 32 and 33 are conceptual views illustrating a method of allowing a wireless power transmitter and a wireless power receiver to perform start-up so as to allow one or more wireless power receivers to perform communication.

A wireless power transmitter according to the present disclosure may carry out a communication start-up sequence to perform communication with one or more wireless power receivers.

The communication start-up sequence may denote a process of transmitting information required between a wireless power transmitter and a wireless power receiver to perform communication between the wireless power transmitter and the wireless power receiver.

More specifically, the wireless power receiver may enter the configuration phase 2020 and negotiation phase 2030 subsequent to allowing any one of a plurality of slots to be allocated from the wireless power transmitter.

The wireless power receiver may transmit information associated with the configuration phase 2020 or information associated with the negotiation phase 2030 during the configuration phase 2020 and negotiation phase 2030. As described above in FIGS. 22 through 27, the information associated with the configuration phase 2020 may be information for identifying a wireless power receiver, and the information associated with the negotiation phase 2030 may be information associated with power received from a wireless power transmitter.

Here, the process of transmitting and receiving information associated with the configuration phase 2020 and negotiation phase 2030 between the wireless power transmitter and the wireless power receiver may be referred to as a communication start-up sequence.

The wireless power transmitter may set the wireless power receiver not to allow a different wireless power receiver other than the wireless power receiver to carry out a communication start-up sequence.

In other words, when performing communication at least one or more wireless power receivers, the wireless power transmitter may set at least two wireless power receivers among the at least one or more wireless power receivers not to carry out a communication start-up sequence.

Here, the wireless power receiver may perform communication with the wireless power transmitter in an exclusive manner while carrying out a communication start-up sequence. More specifically, the wireless power transmitter may deny the reception of information from a wireless power receiver different from the wireless power receiver while carrying out a communication start-up sequence of the wireless power receiver.

For example, referring to FIG. 32, the wireless power receiver may carry out a communication start-up sequence subsequent to the allocation of any one slot 3110 of a plurality of slots from the wireless power transmitter. At this time, the wireless power transmitter may provide at least part 3130 of the plurality of slots to receive only information transmitted from the wireless power receiver to carry out a communication start-up sequence of the wireless power receiver. Here, the at least part of slots 3130 provided to receive only information transmitted from the wireless power receiver may be referred to as locked slots.

In this case, the wireless power receiver may carry out a communication start-up sequence using the locked slots. Through this, the wireless power receiver may carry out the process of a communication start-up sequence without a collision with a wireless power receiver different from the wireless power receiver.

On the other hand, the locked slots may be provided with slots, which are free slots among the plurality of slots. In other words, the locked slot may not provide a slot already allocated to the different wireless power receiver prior to carrying out the start-up sequence of the wireless power receiver as a locked slot.

For example, as illustrated in FIG. 33, a first wireless power receiver and a second wireless power receiver may communication with a wireless power transmitter. Here, any one 3210 of the plurality of slots may be allocated to the second wireless power receiver to carry out a communication start-up sequence. When the any one slot 3210 is allocated, the second wireless power receiver may receive an ACK signal 3220.

Here, when one slot 3110 different from the any one slot 3210 among a plurality of slots is already allocated to the first wireless power receiver prior to carrying out the communication start-up sequence of the second wireless power receiver, the second wireless power receiver may use the remaining slots 3230a, 3230b excluding the any one slot 3110 as locked slots.

Through this, while performing communication with at least one or more wireless power receivers, a wireless power transmitter according to the present disclosure may perform communication without a collision between the at least one or more wireless power receivers.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed:

1. A wireless power transmitter for performing communication with a wireless power receiver using a plurality of slots, the wireless power transmitter comprising:
    a power conversion circuit configured to transmit a wireless power signal to the wireless power receiver; and
    a power transmission controller configured to perform communication with the wireless power receiver to control the wireless power signal,
    wherein the power transmission controller performs steps comprising:
    receiving control information from the wireless power receiver within one slot of the plurality of slots;
    transmitting an acknowledge (ACK) signal to the wireless power receiver in response to the control information; and
    allocating the one slot of the plurality of slots to the wireless power receiver to perform the communication with the wireless power receiver using the one slot of the plurality of slots,
    wherein the power transmission controller is alolowed to transmit the ACK signal to the wireless power receiver when there is no collision between the wireless power receiver and a second wireless power receiver different from the wireless power receiver.

2. The wireless power transmitter of claim 1, wherein the ACK signal is transmitted to the wireless power receiver when the collision between the wireless power receiver and the second wireless power receiver different from the wireless power receiver does not occur, and
    the ACK signal is not transmitted to the wireless power receiver when the collision between the wireless power receiver and the second wireless power receiver different from the wireless power receiver occurs.

3. The wireless power transmitter of claim 2, wherein a state in which the collision between the wireless power receiver and the second wireless power receiver different from the wireless power receiver does not occur is a state in which only the control information of the wireless power receiver is received within the one slot of the plurality of slots, and
    a state in which the collision between the wireless power receiver and the second wireless power receiver different from the wireless power receiver occurs is a state in which the control information of the wireless power receiver and control information of the second wireless power receiver different from the wireless power receiver are received at the same time within the one slot of the plurality of slots.

4. The wireless power transmitter of claim 1, wherein the power transmission controller does not allocate any slot to the wireless power receiver when the ACK signal is not transmitted to the wireless power receiver.

5. The wireless power transmitter of claim 1, wherein the power transmission controller further transmits power to the wireless power receiver subsequent to the allocation of the one slot of the plurality of slots, and
receives only the control information received from the wireless power receiver within the one slot of the plurality of slots while transmitting the power.

6. The wireless power transmitter of claim 1, wherein the power transmission controller limits the reception of control information of the second wireless power receiver different from the wireless power receiver within the one slot of the plurality of slots when the one slot of the plurality of slots is allocated.

7. A communication method of a wireless power transmitter performing communication with a wireless power receiver using a plurality of slots, the method comprising:
receiving control information from the wireless power receiver within one slot of the plurality of slots;
transmitting an acknowledge (ACK) signal to the wireless power receiver in response to the control information; and
allocating the one slot of the plurality of slots to the wireless power receiver to perform the communication with the wireless power receiver using the one slot of the plurality of slots,
wherein the ACK signal is transmitted to the wireless power receiver when there is no collision between the wireless power receiver and a second wireless power receiver different from the wireless power receiver.

8. The method of claim 7, wherein the ACK signal is transmitted to the wireless power receiver when the collision between the wireless power receiver and the second wireless power receiver different from the wireless power receiver does not occur, and the ACK signal is not transmitted to the wireless power receiver when the collision between the wireless power receiver and the second wireless power receiver different from the wireless power receiver occurs.

9. The method of claim 8, wherein a state in which the collision between the wireless power receiver and the second wireless power receiver different from the wireless power receiver does not occur is a state in which only the control information of the wireless power receiver is received within the one slot of the plurality of slots, and
a state in which the collision between the wireless power receiver and the second wireless power receiver different from the wireless power receiver occurs is a state in which the control information of the wireless power receiver and control information of the second wireless power receiver different from the wireless power receiver are received at the same time within the one slot of the plurality of slots.

10. The method of claim 7, wherein the one slot of the plurality of slots is not allocated to the wireless power receiver when the ACK signal is not transmitted in response to the control information.

11. The method of claim 7, further comprising:
transmitting power to the wireless power receiver subsequent to allocating the one slot of the plurality of slots to the wireless power receiver,
wherein the control information is continuously received from the wireless power receiver within the one slot of the plurality of slots while transmitting the power.

12. A wireless power receiver for performing communication with a wireless power transmitter using a plurality of slots, the wireless power receiver comprising:
a power receiving circuit configured with at least one coil for receiving a wireless power signal transferred in a magnetic field; and
a power receiving controller configured to perform communication to control the wireless power signal,
wherein the power receiving controller performs steps comprising:
transmitting control information to the wireless power transmitter using one slot of the plurality of slots;
receiving an acknowledge (ACK) signal from the wireless power transmitter in response to the control information; and
allocating the one slot of the plurality of slots to the wireless power receiver to perform the communication with the wireless power transmitter when the ACK signal is received,
wherein the ACK signal is received in response to the control information transmitted in the one slot, when there is no collision between the wireless power receiver and a second wireless power receiver different from the wireless power receiver.

13. The wireless power receiver of claim 12, wherein a case where the ACK signal is not received is a case where the control information of the wireless power receiver and control information of the second wireless power receiver different from the wireless power receiver are received at the same time within the one slot of the plurality of slots.

14. The wireless power receiver of claim 12, wherein the power receiving controller receives power from the wireless power transmitter subsequent to the allocation of the one slot of the plurality of slots, and transmits the control information to the wireless power transmitter using the one slot of the plurality of slots while receiving the power.

15. The wireless power receiver of claim 12, wherein the one slot of the plurality of slots is a free slot.

16. The wireless power receiver of claim 15, wherein the free slot is a slot allowing the reception of the control information from at least one or more wireless power receivers.

17. A control method of a wireless power receiver performing communication with a wireless power transmitter using a plurality of slots, the method comprising:
transmitting control information to the wireless power transmitter using one slot of the plurality of slots;
receiving an acknowledge (ACK) signal from the wireless power transmitter in response to the control information; and
allocating the one slot of the plurality of slots to the wireless power receiver to perform the communication with the wireless power transmitter when the ACK signal is received,
wherein the ACK signal is received in response to the control information transmitted in the one slot, when there is no collision between the wireless power receiver and a second wireless power receiver different from the wireless power receiver.

* * * * *